(12) United States Patent
Watanabe et al.

(10) Patent No.: US 9,919,681 B2
(45) Date of Patent: Mar. 20, 2018

(54) ON-BOARD COMMUNICATION SYSTEM, AND ON-BOARD DEVICE

(71) Applicants: AUTONETWORKS TECHNOLOGIES, LTD., Yokkaichi-shi, Mie (JP); SUMITOMO WIRING SYSTEMS, LIMITED, Yokkaichi-shi, Mie (JP); SUMITOMO ELECTRIC INDUSTRIES, LTD., Osaka-shi, Osaka (JP)

(72) Inventors: Akiyo Watanabe, Yokkaichi (JP); Atsushi Ogawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/311,760

(22) PCT Filed: Jul. 27, 2015

(86) PCT No.: PCT/JP2015/071220
§ 371 (c)(1),
(2) Date: Nov. 16, 2016

(87) PCT Pub. No.: WO2016/013679
PCT Pub. Date: Jan. 28, 2016

(65) Prior Publication Data
US 2017/0120868 A1    May 4, 2017

(30) Foreign Application Priority Data
Jul. 25, 2014    (JP) .................................. 2014-152091

(51) Int. Cl.
*G01S 13/74*     (2006.01)
*B60R 25/24*     (2013.01)
(Continued)

(52) U.S. Cl.
CPC .......... *B60R 25/245* (2013.01); *B60R 25/209* (2013.01); *E05B 81/56* (2013.01); *G01S 13/74* (2013.01)

(58) Field of Classification Search
CPC ................................ G01S 13/74; E05B 81/56
(Continued)

(56) References Cited

U.S. PATENT DOCUMENTS

2008/0258868 A1   10/2008   Nakajima et al.
2010/0231354 A1    9/2010   Nishiguchi et al.
(Continued)

FOREIGN PATENT DOCUMENTS

DE   102011104230 A1     4/2012
JP     02002364223   *  12/2002
(Continued)

OTHER PUBLICATIONS

U.S. Appl. No. 15/311,724, filed Nov. 16, 2016 in the name of Akiyo Watanabe.
(Continued)

*Primary Examiner* — Vernal Brown
(74) *Attorney, Agent, or Firm* — Oliff PLC

(57) ABSTRACT

In an on-board communication system, an on-board device transmits detection signals from a plurality of antennas provided in a vehicle, and a plurality of portable devices transmits response signals corresponding to the received detection signals. The on-board device performs position detection of the portable devices by receiving the response signals transmitted from the portable devices. Prior to transmission of the detection signals, the antennas transmit a (Continued)

processing start signal. The processing start signal and the detection signals are signals received in common by the plurality of portable devices. Each portable device includes a portable reception unit that receives the detection signals, and a portable transmission unit that, when the portable reception unit has received the detection signals, transmits the response signals, which include information corresponding to the received detection signals.

12 Claims, 22 Drawing Sheets

(51) Int. Cl.
    *B60R 25/20*     (2013.01)
    *E05B 81/56*     (2014.01)

(58) Field of Classification Search
    USPC ........................................................ 340/5.62
    See application file for complete search history.

(56) References Cited

U.S. PATENT DOCUMENTS

| | | |
|---|---|---|
| 2010/0231465 A1 | 9/2010 | Tanaka |
| 2012/0092129 A1* | 4/2012 | Lickfelt ................. B60R 25/24 340/5.72 |
| 2012/0271487 A1* | 10/2012 | Lickfelt ................. B60R 25/00 701/2 |

FOREIGN PATENT DOCUMENTS

| | | |
|---|---|---|
| JP | 2010-219628 A | 9/2010 |
| JP | 2010-236346 A | 10/2010 |
| JP | 2011-144624 A | 7/2011 |
| JP | 2012-184609 A | 9/2012 |
| WO | 2015-107609 A1 | 7/2015 |

OTHER PUBLICATIONS

U.S. Appl. No. 15/311,733, filed Nov. 16, 2016 in the name of Akiyo Watanabe et al.

Aug. 18, 2015 Written Opinion of the International Searching Authority issued in International Patent Application No. PCT/JP2015/071222.

Oct. 6, 2015 Written Opinion of the International Searching Authority issued in International Patent Application No. PCT/JP2015/071208.

Oct. 6, 2015 Written Opinion of the International Searching Authority issued in International Patent Application No. PCT/JP2015/071220.

Office Action dated Jul. 5, 2017 in U.S. Appl. No. 15/311,733 filed in the name of Akiyo Watanabe et al.

* cited by examiner

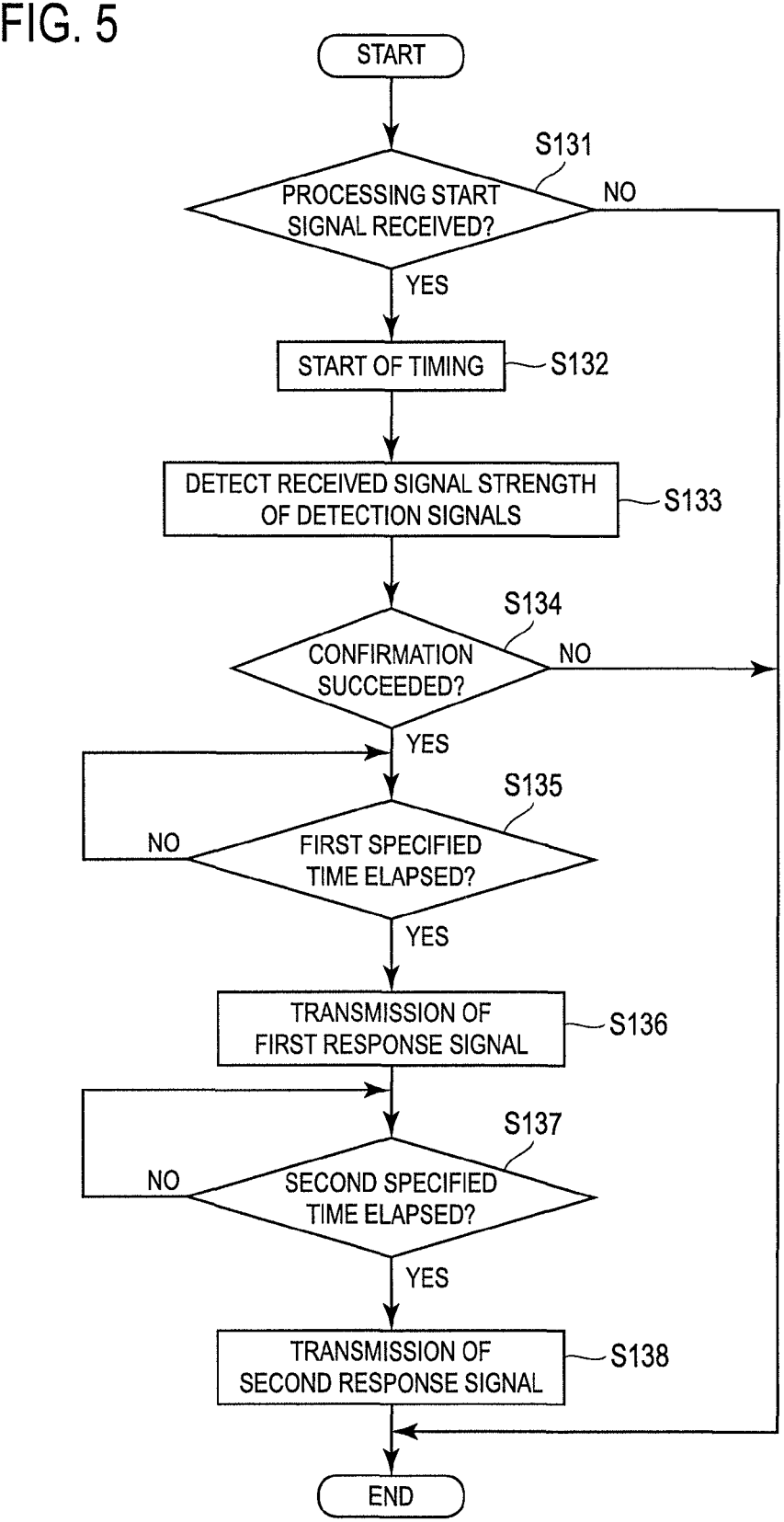

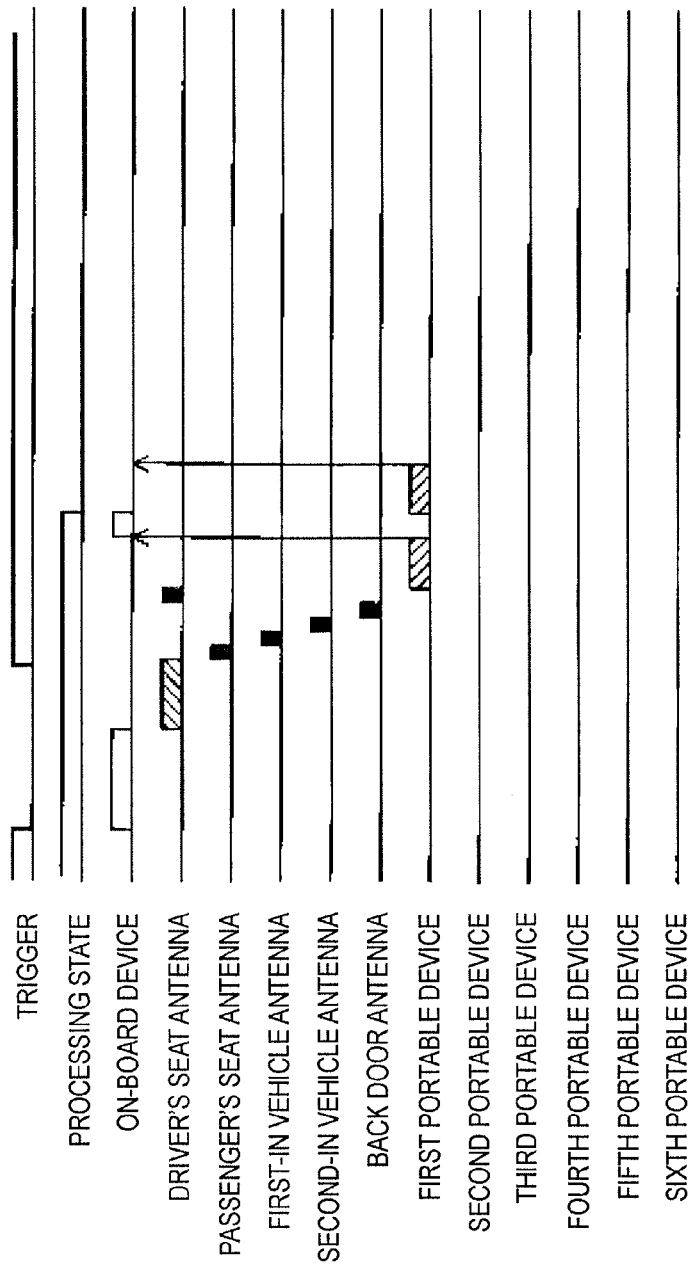
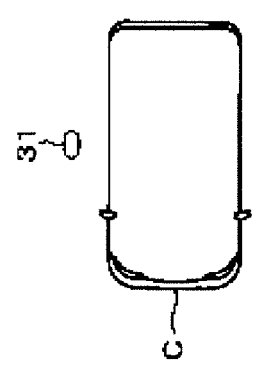
FIG. 6A
FIG. 6B

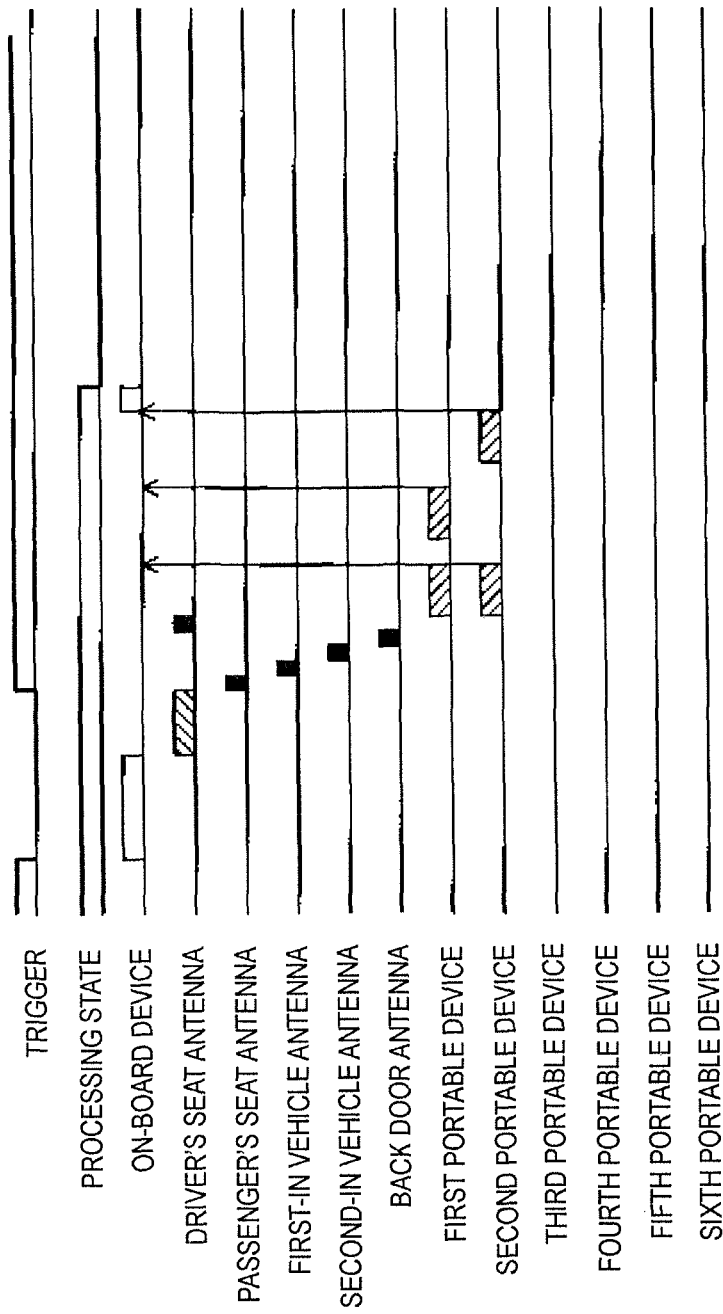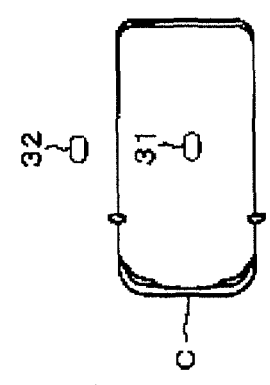

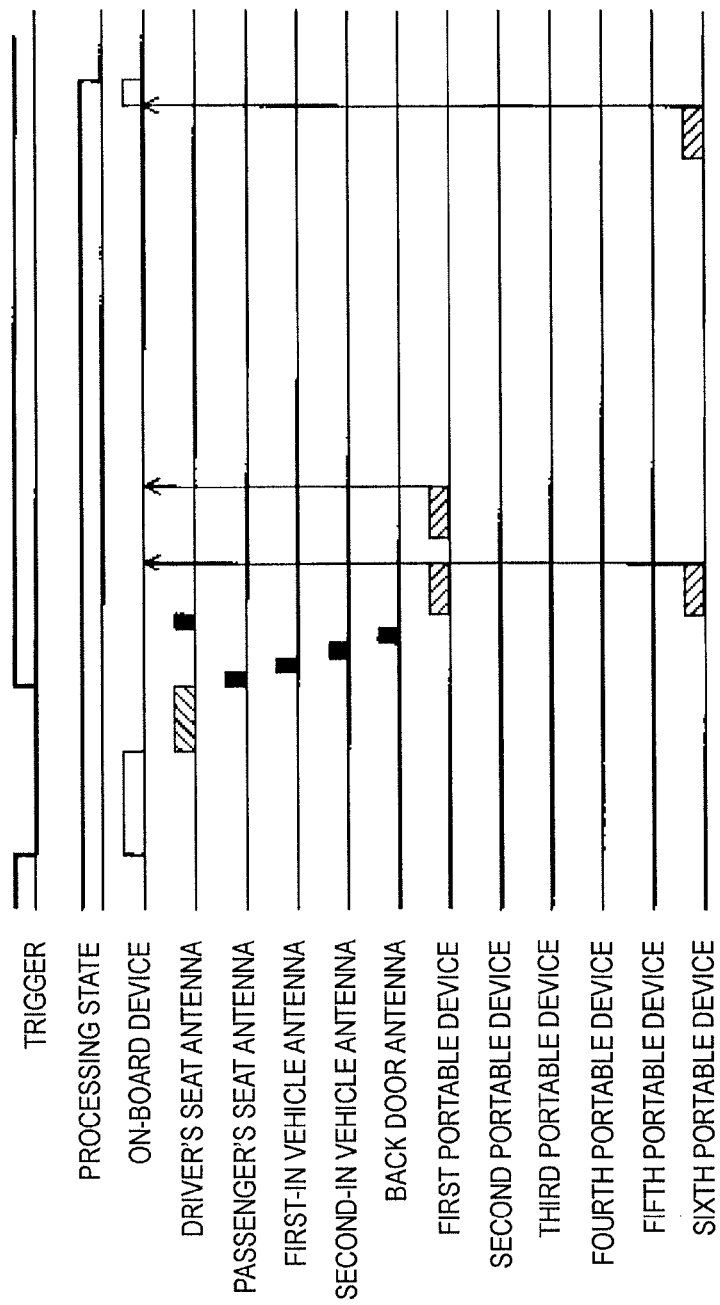
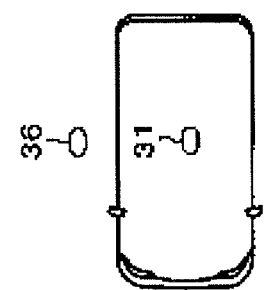
FIG. 10A
FIG. 10B

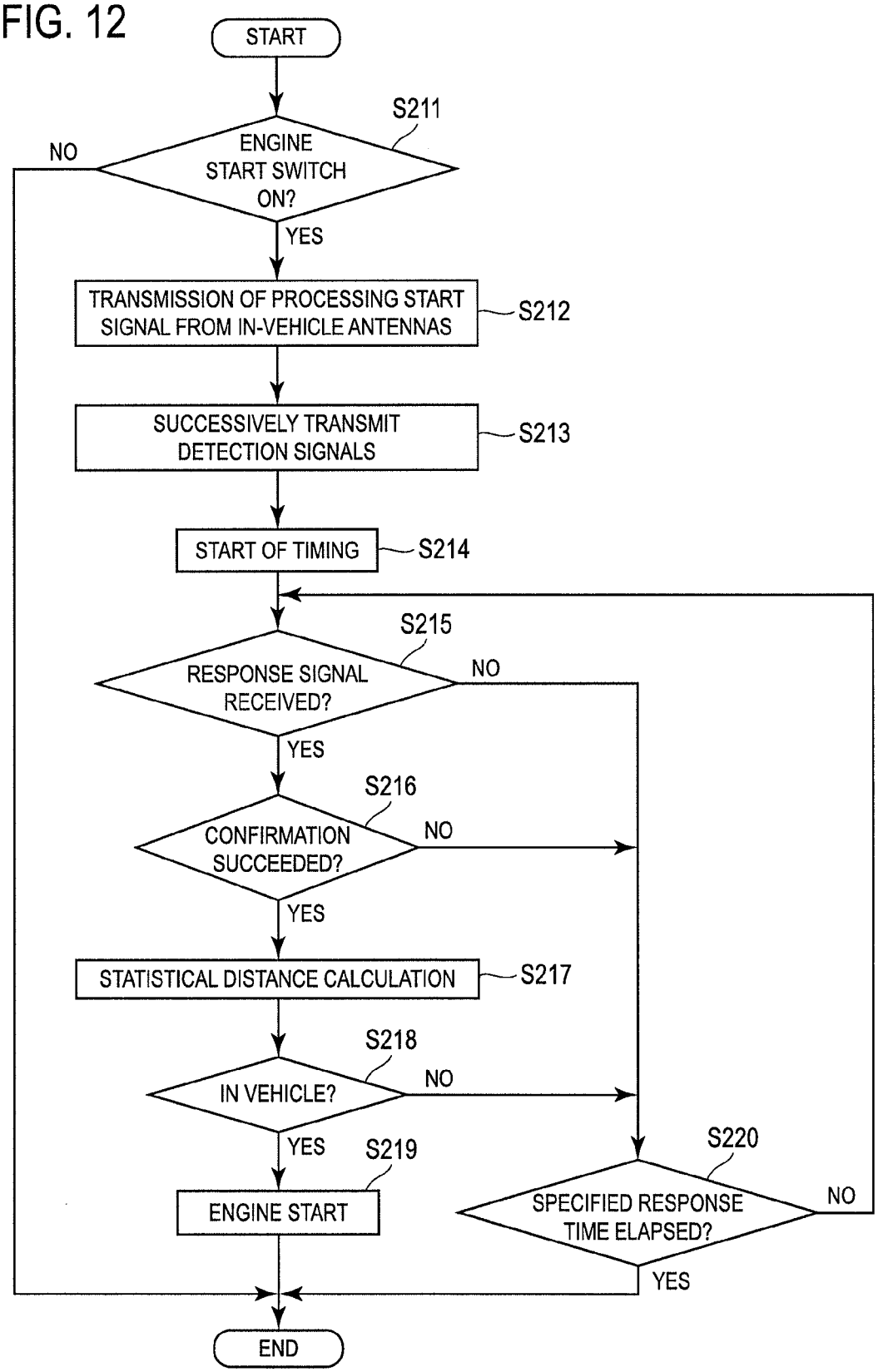

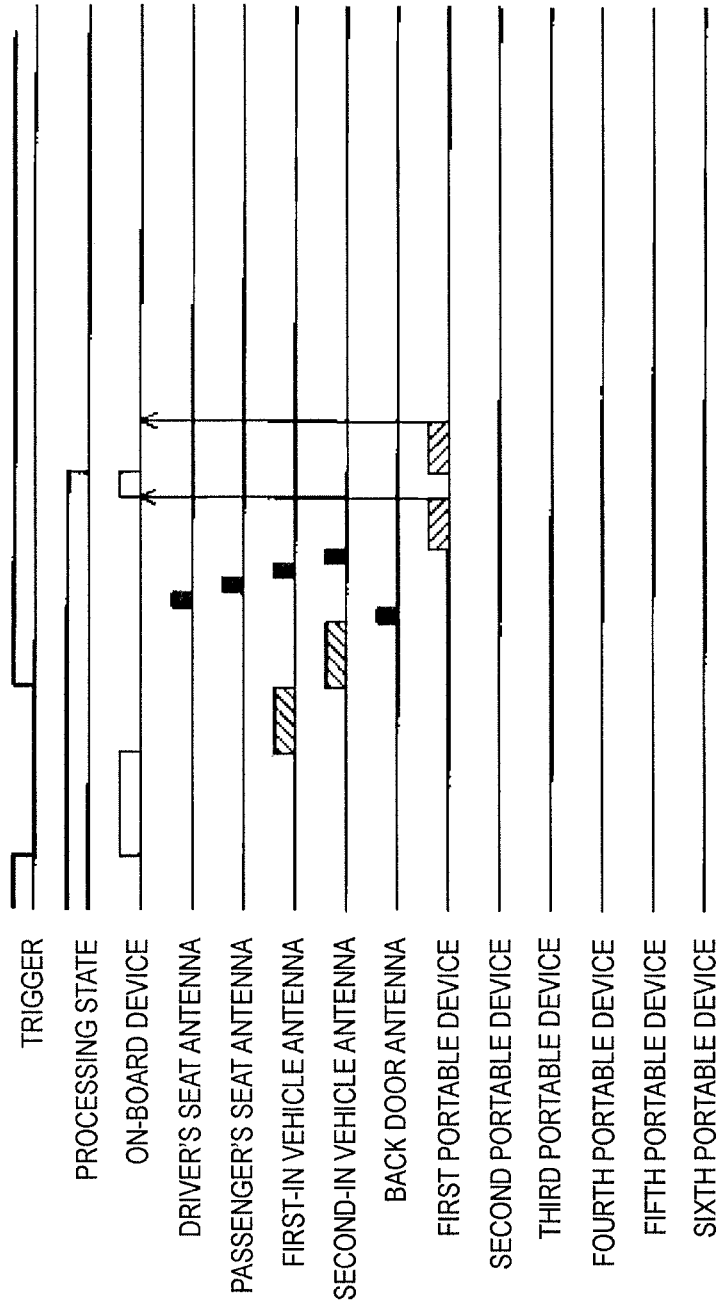
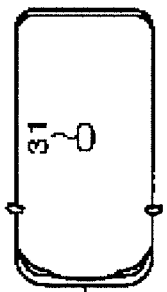
FIG. 13A
FIG. 13B

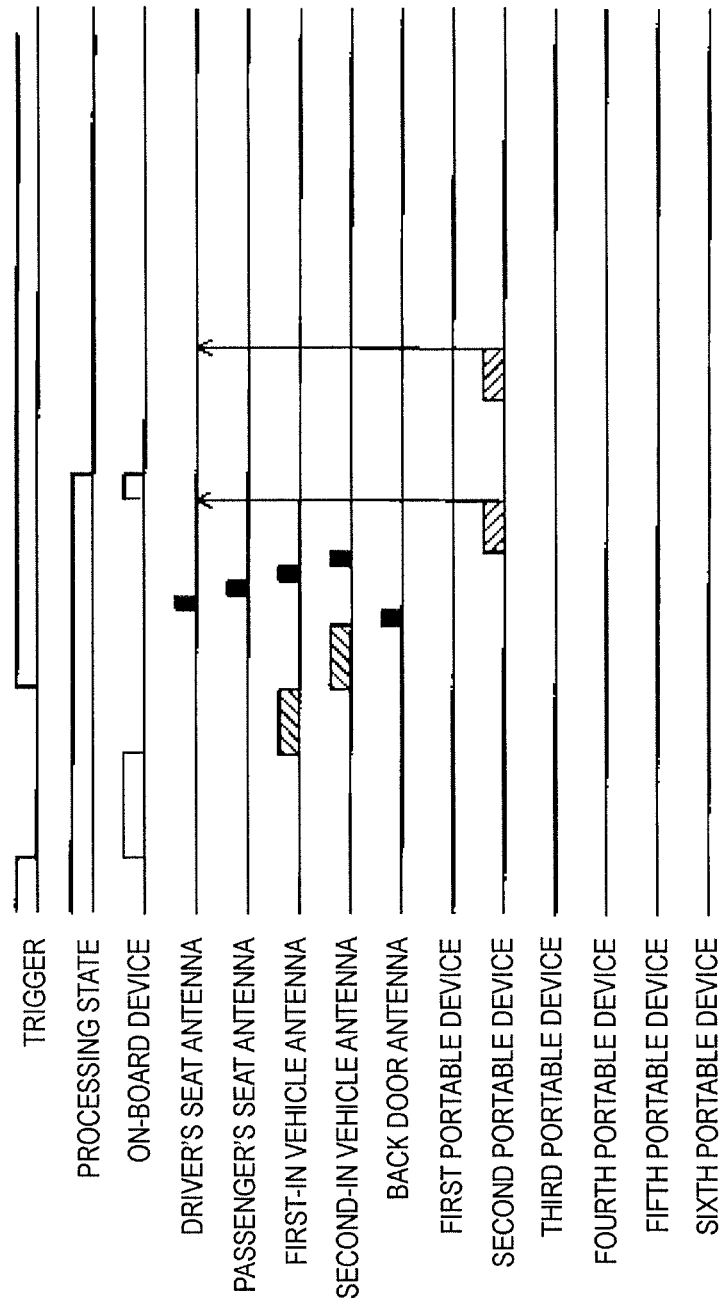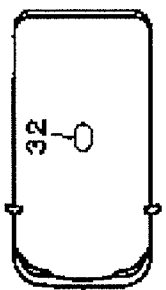

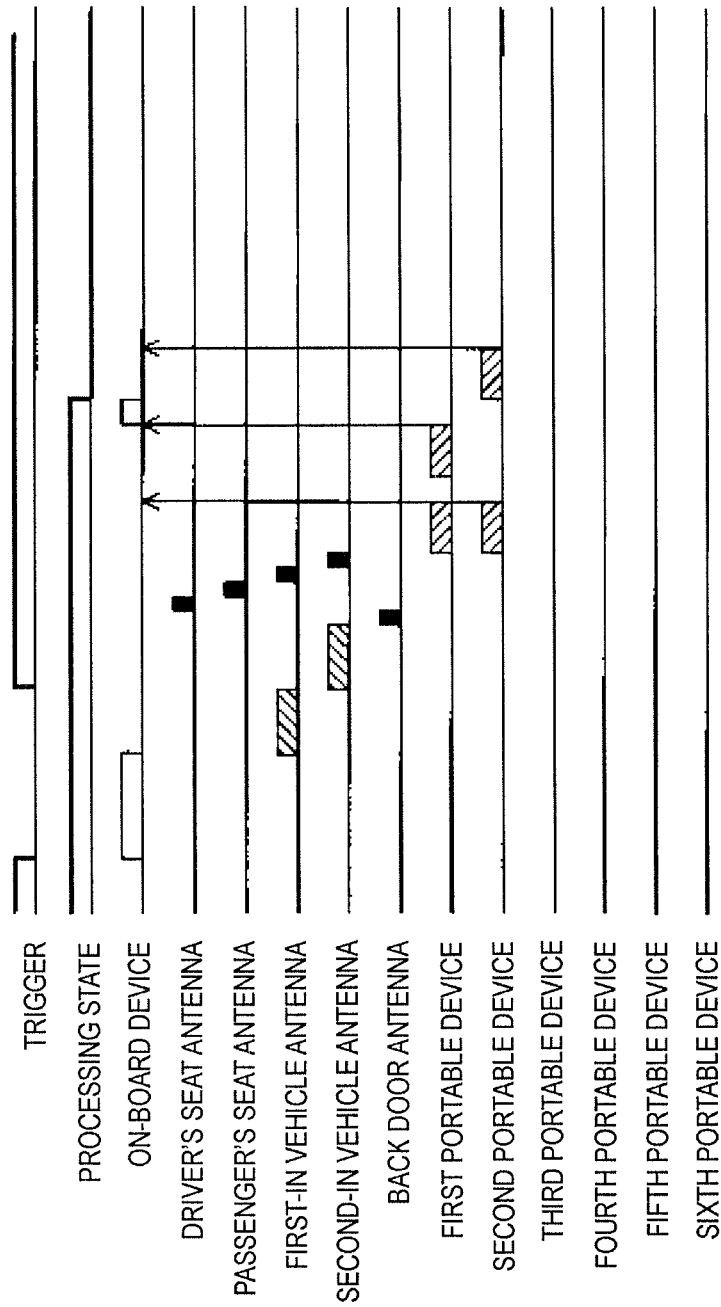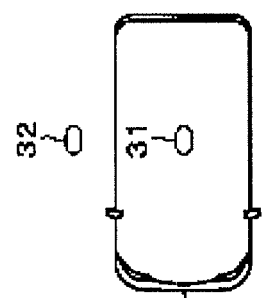
FIG. 15A
FIG. 15B

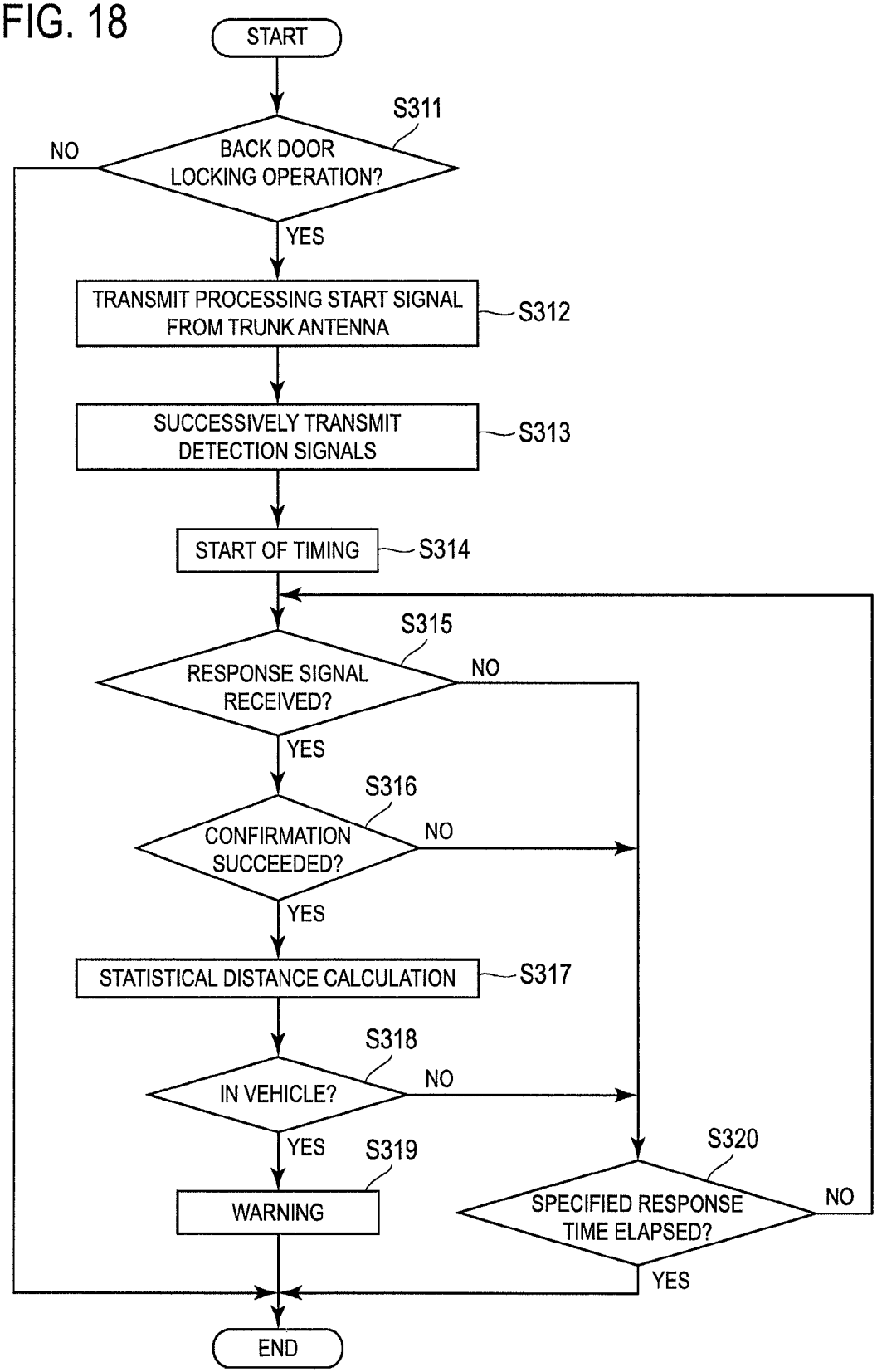

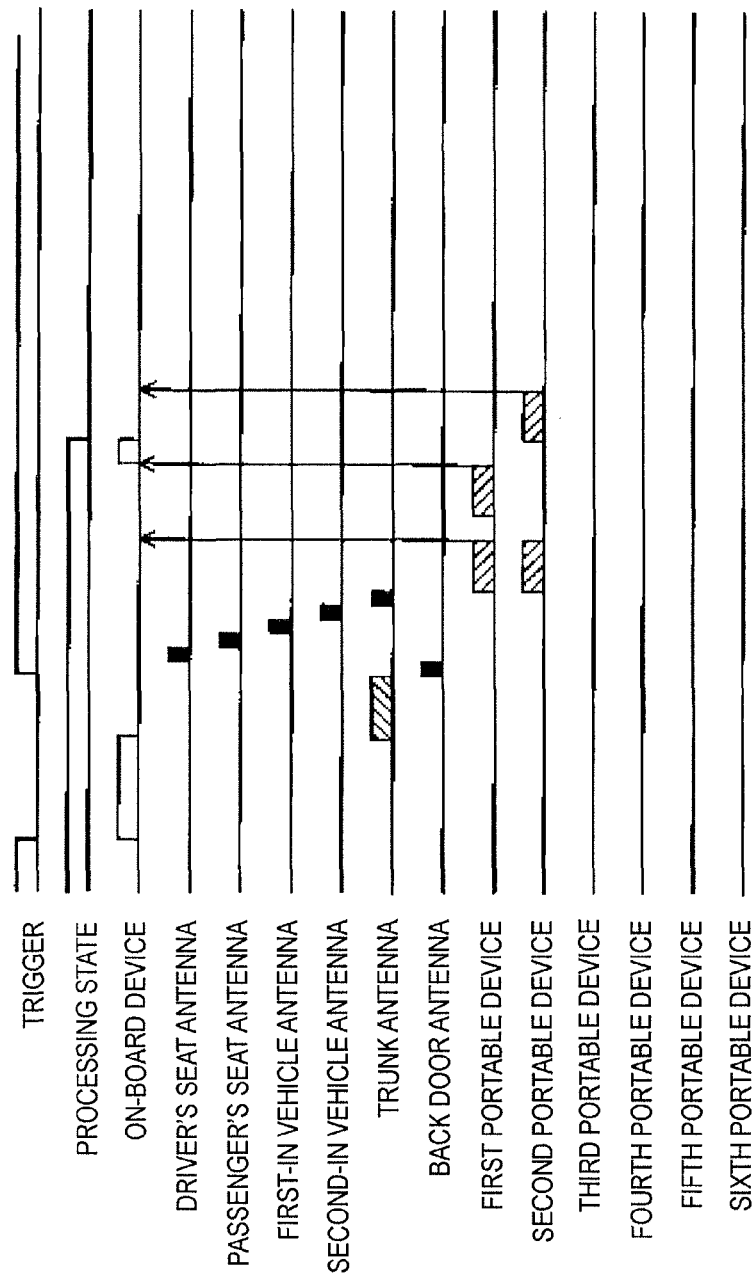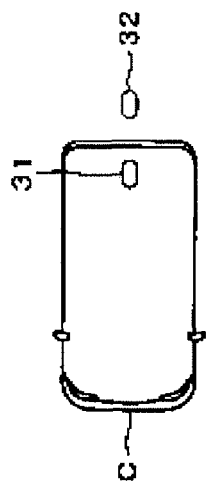
FIG. 20A
FIG. 20B

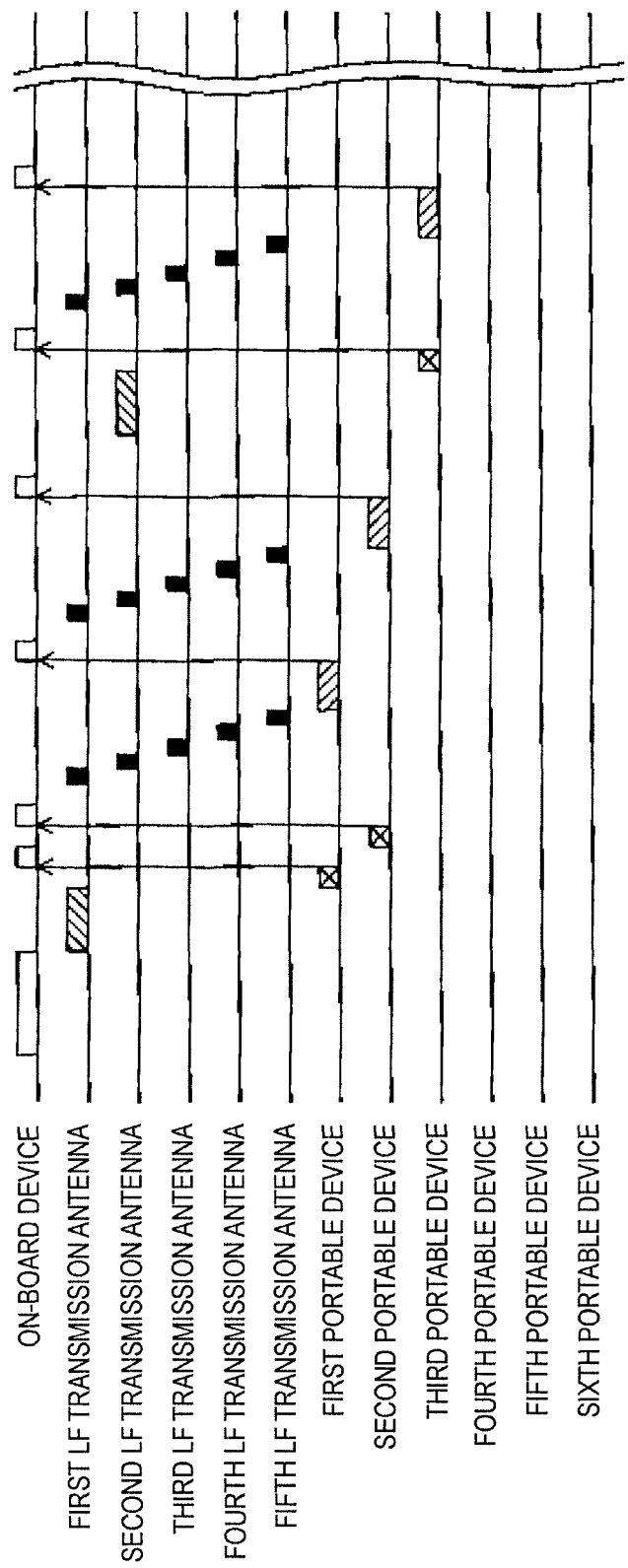

ON-BOARD COMMUNICATION SYSTEM, AND ON-BOARD DEVICE

This invention relates to an on-board communication system, and to an on-board device that constitutes the on-board communication system.

BACKGROUND

Passive entry systems are being utilized, which enable locking and unlocking of vehicle doors without the use of a mechanical key. Passive entry systems are constituted by a portable device possessed by a user, a contact sensor that detects when the user grasps the door handle, and an on-board device that detects the position of the portable device when the user grasps the door handle and performs vehicle door locking processing or unlocking processing.

When the contact sensor detects that the user has grasped the door handle, the on-board device transmits wake-up signals from a plurality of LF transmitting antennas provided in the vehicle, and activates the portable device. The activated portable device transmits to the vehicle a specified signal indicating its existence. When the on-board device receives the specified signal, it transmits, from the LF transmitting antennas, detection signals for detecting the position of the portable device. The portable device receives the detection signals transmitted from the various LF transmitting antennas, and measures the received signal strength. The portable device then transmits information regarding the measured received signal strengths to the on-board device. The on-board device receives the information regarding the measured received signal strengths from the portable device, determines whether the portable device is inside the vehicle, and performs processing corresponding to the determination result. For example, if the portable device is positioned outside the vehicle, the on-board device performs vehicle door locking processing or unlocking processing.

In Publication JP-A-2010-236346 (P2010-236346), an on-board device and a portable device are disclosed that can shorten processing time. The on-board device improves communication processing speed by simultaneously transmitting signals, with a phase difference provided, from a plurality of LF transmitting antennas inside the vehicle.

Meanwhile, in a conventional passive entry system, when there are a plurality of portable devices, a portable device is activated for each LF transmitting antenna, and transmitting and receiving of information necessary for determining whether the activated portable devices are inside or outside the vehicle is separately performed for each portable device.

FIG. 22 is a timing chart that shows signals transmitted and received in conventional portable device position detection processing. In a vehicle, there are provided first through fifth LF transmitting antennas that transmit detection signals for detecting the position of portable devices, and an on-board device transmits various signals such as detection signals from each LF transmitting antenna, and thereby detects the position of the portable devices. There are six portable devices that constitute the passive entry system, and the respective portable devices are labeled the first portable device through the sixth portable device. In FIG. 22, "on-board device" is a timing chart showing the processing execution state of an on-board control unit provided in the on-board device. In FIG. 22, "first LF transmitting antenna" through "fifth LF transmitting antenna" are timing charts showing the timing of transmitting signals from the various LF transmitting antennas, and "first portable device" through "sixth portable device" are timing charts showing the timing of transmitting signals from the first through sixth portable devices.

As shown in FIG. 22, in specified cases, the on-board device transmits a wake-up signal from the first LF transmitting antenna. In FIG. 22, the rectangular portions with downward-left hatching show the timing at which the wake-up signal is transmitted. The wake-up signal is transmitted toward the first through sixth portable devices. Each portable device for which the wake-up signal is successfully received is activated from a sleep state, and transmits to the on-board device an ID signal indicating its own existence. In FIG. 22, the rectangular portions with an x-mark show the timing at which ID signals are transmitted. In the example shown in FIG. 22, the first portable device and the second portable device have successfully received the wake-up signal, and each portable device is transmitting its own ID signal to the on-board device.

The on-board device, which has received the ID signals, separately sends detection signals to each activated portable device. For example, when the first portable device and the second portable device have been activated, the on-board device first sends detection signals to the first portable device from the first through sixth LF transmitting antennas. In FIG. 22, the solid black rectangular portions show the timing at which detection signals for detecting portable device position are transmitted. The first portable device measures the received signal strength of the detection signals, and transmits to the on-board device a response signal that includes the received signal strengths obtained by the measurements. In FIG. 22, the rectangular portions with downward-right hatching show the timing at which response signals are transmitted. The on-board device receives the response signal from the first portable device, and performs position detection for the first portable device. That is, the on-board device performs a determination of whether the first portable device is inside the vehicle or outside the vehicle. If the first portable device is not outside the vehicle, the on-board device sends detection signals to the activated second portable device from the first through sixth LF transmitting antennas, and in the same manner performs position detection for the second portable device.

If the first portable device and the second portable device activated by the wake-up signal from the first LF transmitting antenna are not inside the vehicle, the on-board device next transmits a wake-up signal from the second LF transmitting antenna, and similarly transmits detection signals to the activated portable devices and, based on response signals from the activated portable devices, performs position detection for each portable device. In the example shown in FIG. 22, the third portable device has been activated through the wake-up signal transmitted from the second LF transmitting antenna, and the on-board device performs position detection for the third portable device.

Thereafter, in the same manner, wake-up signals are transmitted from the third through sixth LF transmitting antennas, detection signals are transmitted to the activated portable devices, and position detection is performed for the activated portable devices. The on-board device repeatedly performs the above processing until a portable device outside the vehicle is detected.

SUMMARY

In a conventional passive entry system, because the structure is such that the portable devices are activated by transmitting a wake-up signal per each LF transmitting antenna, and if there are a plurality of active portable devices, sending and receiving of information necessary for position detection of the portable devices is performed separately with each active portable device, there was the problem that time was needed for the communication of information required for door locking processing or unlocking processing. For example, when a portable device activated by a wake-up signal transmitted from the fifth LF transmitting antenna is outside the vehicle and position detection processing for the portable device was performed last, a corresponding amount of time is required before the vehicle door is unlocked, creating the possibility that the user will feel irritated.

This invention has been made in consideration of such circumstances, and has an object of providing an on-board communication system, and an on-board device that constitutes the on-board communication system, in which it is possible to shorten the time needed for portable device position detection.

An on-board communication system related to this invention is an on-board communication system comprising (i) an on-board device that transmits detection signals from a plurality of antennas provided in a vehicle and (ii) a plurality of portable devices that each transmit response signals corresponding to the received detection signals. The on-board device performs position detection of the portable devices by receiving the response signals transmitted from the portable devices. The detection signals are signals received in common by the plurality of portable devices. The on-board device is provided with an on-board transmission unit that successively transmits the detection signals from the plurality of antennas, at a different timing for each of the plurality of antennas. The portable devices are provided with (i) a portable reception unit that receives the detection signals transmitted by the on-board transmission unit, and (ii) a portable transmission unit that, when the portable reception unit has received the detection signals, transmits the response signals, which include information corresponding to the received detection signals.

In an on-board communication system related to this invention, the on-board transmission unit, prior to transmission of the detection signals, transmits from the antennas a processing start signal for starting reception processing of the detection signals by the portable devices. The processing start signal is a signal received in common by the plurality of portable devices. The portable reception unit starts receiving the detection signals upon receiving the processing start signal transmitted by the on-board transmission unit.

In an on-board communication system related to this invention, the on-board transmission unit successively transmits the processing start signals and the detection signals.

In an on-board communication system related to this invention, the portable device is provided with a detection unit that detects received signal strengths for the detection signals received by the portable reception unit. The portable transmission unit transmits the response signals, which include the received signal strengths detected by the detection unit. The on-board device identifies the position of the portable device, on the basis of the received signal strengths included in the response signals.

In an on-board communication system related to this invention, the on-board device (i) is provided with a detection unit that detects received signal strengths for the detection signals received by the portable reception unit, and (ii) identifies a position of the portable device on the basis of the received signal strengths detected by the detection unit. The portable transmission unit transmits response signals, which include the identified position information.

An on-board device related to this invention is an on-board device that (i) transmits, from a plurality of antennas provided in a vehicle, detection signals for detecting the position of a plurality of portable devices, and (ii) performs position detection for the portable devices by receiving response signals transmitted from the portable devices in response to the detection signals. The detection signals are signals received in common by the plurality of portable devices. An on-board transmission unit is provided that successively transmits the detection signals from the plurality of antennas, at a different timing for each of the plurality of antennas.

In an on-board device related to this invention, the on-board transmission unit, prior to transmission of the detection signals, transmits from the antennas a processing start signal for causing the start of reception processing of the detection signals by the portable devices. The processing start signal is a signal received in common by the plurality of portable devices.

In an on-board device related to this invention, the on-board transmission unit successively transmits the processing start signals and the detection signals.

In this invention, the on-board transmission unit transmits detection signals for detecting positions of portable devices to the portable devices from a plurality of antennas provided in a vehicle, with a different timing for each of the antennas. The detection signals are signals received in common by the plurality of portable devices, and are not signals that are transmitted to a specific portable device. The on-board transmission unit transmits the detection signals successively from the plurality of antennas, without waiting for responses from the portable devices. That is, the on-board device transmits a detection signal from the first antenna, then transmits a detection signal from the second antenna without waiting for a response from the portable devices, and thereafter similarly transmits detection signals from the other antennas.

A portable device receives, by a portable reception unit, the detection signals transmitted from the on-board device. A portable transmission unit transmits to the on-board device response signals, which include information corresponding to the received detection signals.

The on-board device has a structure that detects the positions of the portable devices by successively transmitting to the plurality of portable devices detection signals that can be received in common by the plurality of portable devices, so compared to cases where communication is performed individually with each of the portable devices, it is possible to shorten the time needed for information communication between the on-board device and the portable devices, and it is possible to perform position detection of the portable devices efficiently.

The on-board transmission unit need not transmit the detection signals successively from all of the antennas provided in the vehicle, for included in this invention is a structure in which at the stage at which detection signals are transmitted from a portion of the plurality of antennas, out of all of the antennas, response signals are received from the portable devices and then detection signals are transmitted from the other antennas. For example, included in this invention is a structure such that when five antennas are provided in the vehicle, the on-board transmission unit transmits detection signals from four of the antennas, and a portable device, upon receiving detection signals from four antennas, transmits a response signal to the on-board device.

In this invention, the on-board transmission unit transmits to each portable device a processing start signal for causing the start of reception processing of the detection signals by the portable device, in advance of transmitting the detection signals. The processing start signal is a signal received in common by the plurality of portable devices, and is not a signal that is transmitted to a specific portable device. A portable device that has received the processing start signal starts receiving the detection signals.

The on-board device has a structure that detects the positions of the portable devices by transmitting to the plurality of portable devices a processing start signal and detection signals that can be received in common by the plurality of portable devices, so compared to cases where communication is performed individually with each of the portable devices, it is possible to shorten the time needed for information communication between the on-board device and the portable devices, and it is possible to perform position detection of the portable devices efficiently.

In this invention, the on-board transmission unit successively transmits the processing start signal and the detection signals. That is, the on-board transmission unit transmits the processing start signal and then transmits the detection signals without waiting for a response from the portable devices that received the processing start signal. Accordingly, it is possible to shorten the time needed for information communication between the on-board device and the portable devices, and it is possible to perform position detection of the portable devices efficiently.

In this invention, the portable devices detect received signal strengths of detection signals received from each of the antennas, and transmit to the on-board device response signals that include the received signal strengths detected. The received signal strength of each of the detection signals detected by a portable device changes depending on the position of the portable device relative to the on-board device. Accordingly it is possible to identify the position of the portable device, through the received signal strength of each of the detection signals. The on-board device receives a response signal transmitted from the portable device, and identifies the position of the portable device using the received signal strengths included in the response signal received. That is, the on-board device detects the position of the portable device through the response signal received from the portable device.

In this invention, the portable devices detect received signal strengths of detection signals received from each of the antennas. The received signal strength of each of the detection signals detected by a portable device changes depending on the position of the portable device relative to the on-board device. Accordingly, it is possible to identify the position of the portable device, through the received signal strength of each of the detection signals. The portable device identifies the position of the portable device on the basis of the received signal strengths detected, and transmits to the on-board device a response signal that includes the identified position information. The on-board device detects the position of the portable device by receiving a response signal that includes the identified position information of the portable device.

Position detection of the portable device performed by the on-board device does not necessarily require the on-board device to perform all processing on the basis of the received signal strengths. A portion of the position detection processing may be executed on the portable device side. For example, processing in which the on-board device receives a response signal that includes position information transmitted from the portable device side and determines the position of the portable device through referencing position information included in the received response signal is included in position detection processing performed by the on-board device.

According to the present invention, it is possible to shorten the time needed for position detection of a portable device.

BRIEF DESCRIPTION OF THE DRAWINGS

FIG. 5 is a flowchart showing a processing sequence of a portable device, related to vehicle door locking or unlocking.

FIG. 6 is an explanatory diagram showing a first example of processing related to vehicle door locking or unlocking.

FIG. 9 is an explanatory diagram showing a fourth example of processing related to vehicle door locking or unlocking.

FIG. 10 is an explanatory diagram showing a fifth example of processing related to vehicle door locking or unlocking.

FIG. 12 is a flowchart showing a processing sequence at the time of engine starting.

FIG. 13 is an explanatory diagram showing a first example of processing related to engine starting.

FIG. 14 is an explanatory diagram showing a second example of processing related to engine starting.

FIG. 15 is an explanatory diagram showing a third example of processing related to engine starting.

FIG. 18 is a flowchart showing a processing sequence related to preventing trunk lock-in.

FIG. 19 is an explanatory diagram showing a first example of processing related to preventing trunk lock-in.

FIG. 20 is an explanatory diagram showing a second example of processing related to preventing trunk lock-in.

FIG. 21 is an explanatory diagram showing a third example of processing related to preventing trunk lock-in.

FIG. 22 is a timing chart showing signals transmitted and received in position detection processing of a portable device in conventional technology.

DETAILED DESCRIPTION OF EMBODIMENTS

Below, the present invention is described in detail with reference to the drawings, which show embodiments thereof.

First Embodiment (Configuration of On-Board Communication System)

Figure 1:
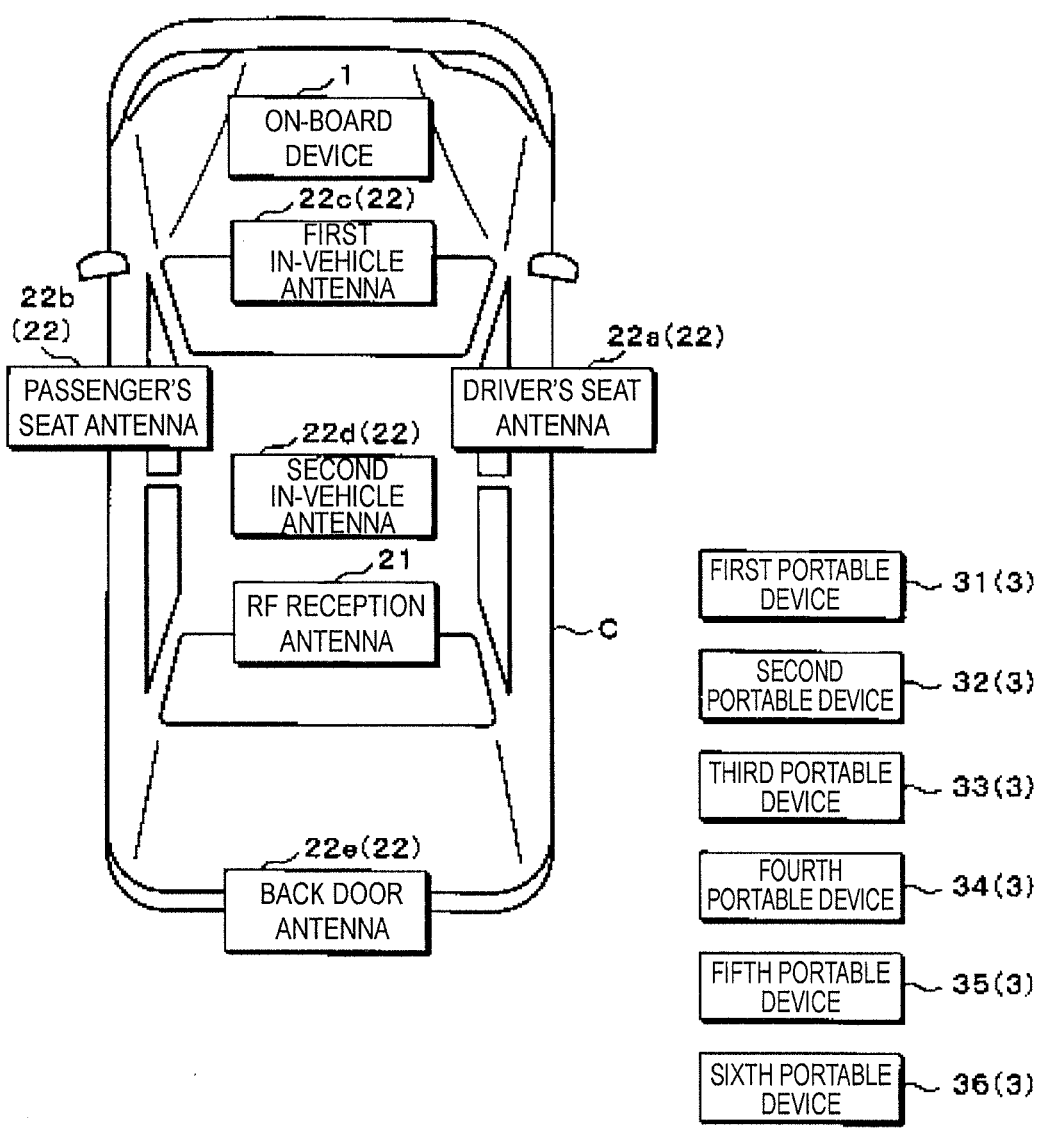
FIG. 1 is a schematic diagram showing a structural example of an on-board communication system.

FIG. 1 is a schematic diagram showing a structural example of an on-board communication system. The on-board communication system according to this embodiment comprises an on-board device 1 that sends and receives various types of signals using a plurality of LF transmission antennas 22 and an RF reception antenna 21 disposed in a vehicle C, and a plurality of portable devices 3 that send signals to and receive signals from the on-board device 1. The on-board device 1 performs position detection of the portable devices 3, and executes prescribed processing using the results of position detection of the portable devices 3, such as vehicle door locking processing or unlocking processing. In this embodiment, position detection refers to a vehicle inside/outside determination that determines whether a portable device 3 is inside the vehicle or outside the vehicle. However, the meaning of position detection in the present invention is not necessarily limited to this.

The plurality of LF transmission antennas 22 is, for example, a driver's seat antenna 22a, a passenger's seat antenna 22b, a first in-vehicle antenna 22c, a second in-vehicle antenna 22d, and a back door antenna 22e, and each of the LF transmission antennas 22 transmits signals using radio waves in the LF band. The LF band is one example of a radio wave band for transmitting signals, but the band is not limited to this. The driver's seat antenna 22a and the passenger's seat antenna 22b are respectively arranged at the pillar on the driver's seat side and at the pillar on the passenger's seat side. The first in-vehicle antenna 22c is disposed at the front of the vehicle C, and the second in-vehicle antenna 22d is arranged at the center of the vehicle C. The back door antenna 22e is arranged at the back door of the vehicle C.

The first in-vehicle antenna 22c and the second in-vehicle antenna 22d are for performing position detection of portable devices 3 inside the vehicle, by transmitting various types of signals primarily to portable devices 3 that are inside the vehicle. The first in-vehicle antenna 22c and the second in-vehicle antenna 22d each transmit various types of signals primarily to in-vehicle areas near the respective various antennas. More specifically, the first in-vehicle antenna 22c and the second in-vehicle antenna 22d function as in-vehicle antennas that transmit processing start signals for causing processing for detecting positions of the portable devices 3 to start, primarily for portable devices 3 inside the vehicle. Detection signals for detecting positions of portable devices 3 have a structure that transmits from basically all of the LF transmission antennas 22, and even when detecting positions of portable devices 3 outside the vehicle, the first in-vehicle antenna 22c and the second in-vehicle antenna 22d function as antennas that transmit detection signals to the portable devices 3.

The reason two in-vehicle antennas, that is the first in-vehicle antenna 22c and the second in-vehicle antenna 22d, are provided is because one LF transmission antenna 22 cannot cover the entire in-vehicle area, or in other words, the portable devices 3 cannot receive the various signals transmitted from one LF transmission antenna 22 in the entire area inside the vehicle.

Meanwhile, the driver's seat antenna 22a, the passenger's seat antenna 22b and the back door antenna 22e primarily transmit various signals to portable devices 3 outside the vehicle, and thereby perform position detection of portable devices 3 outside the vehicle. The driver's seat antenna 22a, the passenger's seat antenna 22b and the back door antenna 22e respectively transmit various signals primarily to areas outside the vehicle near each of the antennas. More specifically, the driver's seat antenna 22a, the passenger's seat antenna 22b and the back door antenna 22e function as outside-of-vehicle antennas that transmit processing start signals primarily to portable devices 3 outside the vehicle. The detection signals for detecting the positions of the portable devices 3 have a structure that transmits from basically all of the LF transmission antennas 22, and even when detecting the positions of portable devices 3 inside the vehicle, the driver's seat antenna 22a, the passenger's seat antenna 22b and the back door antenna 22e function as antennas for transmitting detection signals to the portable devices 3.

In the description below, an example is described in which position detection signals are transmitted from all of the LF transmission antennas 22, but a structure in which detection signals are transmitted from only a portion of the plurality of LF transmission antennas 22 depending on the circumstances is not excluded from the present invention.

In this first embodiment, the explanation will assume that six portable devices 3 exist, namely a first portable device 31, a second portable device 32, a third portable device 33, a fourth portable device 34, a fifth portable device 35 and a sixth portable device 36.

Figure 2:
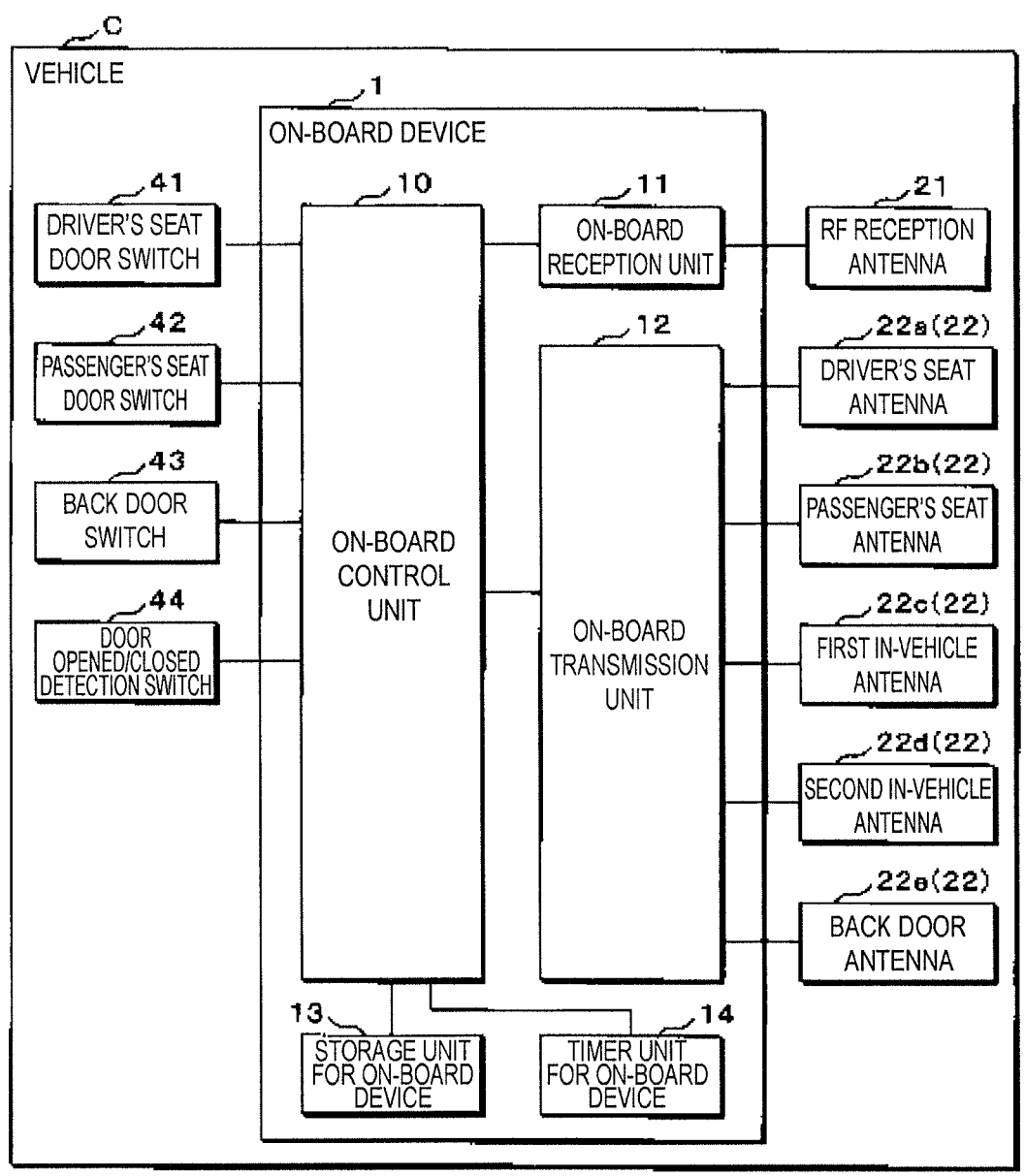
FIG. 2 is a block diagram showing a structural example of an on-board device.

FIG. 2 is a block diagram showing a structural example of an on-board device 1. The on-board device 1 comprises an on-board control unit 10 that controls the actions of the various constituent parts of the on-board device 1. The on-board control unit 10 is a microcomputer including, for example, one or a plurality of central processing units (CPU), multi-core CPU or the like. The on-board control unit 10 is provided with an on-board reception unit 11, an on-board transmission unit 12, a storage unit for on-board device 13 and a timer unit for on-board device 14.

The on-board control unit 10 executes a below-described control program stored in the storage unit for on-board device 13, and thereby controls the actions of the various constituent parts, detects the positions of the portable devices 3 and executes prescribed processing corresponding to the results of position detection.

The storage unit for on-board device 13 is non-volatile memory such as electrically erasable programmable ROM (EEPROM), flash memory or the like. The storage unit for on-board device 13 stores a control program with which the on-board control unit 10 controls the actions of the various constituent parts of the on-board device 1, and thereby accomplishes determinations of whether portable devices 3 are inside or outside the vehicle and executes vehicle door locking processing or unlocking processing.

The on-board reception unit 11 is connected to the RF reception antenna 21, receives various signals such as response signals transmitted from the portable devices 3 using UHF-band radio waves, and outputs the received signals to the on-board control unit 10. Because the communicable area with UHF-band radio waves is broad, placement of the RF reception antenna 21 in the vehicle C is not particularly limited.

The on-board transmission unit 12 is connected to the plurality of LF transmission antennas 22, and transmits the detection signals for accomplishing vehicle inside/outside determination of the portable devices 3 under control by the on-board control unit 10. The strength of the detection signals transmitted from each of the LF transmission antennas 22 is set such that the portable devices 3 inside the vehicle or outside the vehicle can receive detection signals from two or more of the LF transmission antennas 22.

The timer unit for on-board device 14 starts timing under control by the on-board control unit 10, and provides the timing results to the on-board control unit 10. The timer unit for on-board device 14 is for accomplishing timeout processing or the like when there has been no response signal from a portable device 3 with regard to the detection signals transmitted from the on-board device 1.

A driver's seat door switch 41, a passenger's seat door switch 42 and a back door switch 43 or the like are connected to the on-board control unit 10, and door signals corresponding to the operation state of the door switches are input to the on-board control unit 10. Below, any of the driver's seat door switch 41, the passenger's seat door switch 42 and the back door switch 43 is called "door switch" as needed. The on-board control unit 10 can recognize the operation state of the driver's seat door switch 41, the passenger's seat door switch 42 and the back door switch 43 on the basis of the door signals from each of the door switches. The driver's seat door switch 41 or the passenger's seat door switch 42 is a switch for unlocking or locking the vehicle door on the driver's side or the passenger's side, respectively, and is provided at the outside of the driver's seat or the outside of the passenger's seat. The back door switch 43 is a switch for locking or unlocking the back door that is one of the vehicle doors, and is provided at the outside of the back door. Each door switch is a push button. Instead of a push button, a contact sensor that detects contact by the user on the door handle may be provided. In addition, the on-board control unit 10 may directly acquire the door signal in response to operation of any of the door switches, or may acquire the door signal via a door electronic control unit (ECU) or other ECU.

In addition, a door opened/closed detection switch 44 that detects the opening and closing of each vehicle door is connected to the on-board control unit 10. The door opened/closed detection switch 44 is a switch that turns on and off in response to the opening and closing of a vehicle door, and is configured such that an opened/closed signal corresponding to the on/off state is input to the on-board control unit 10.

Figure 3:
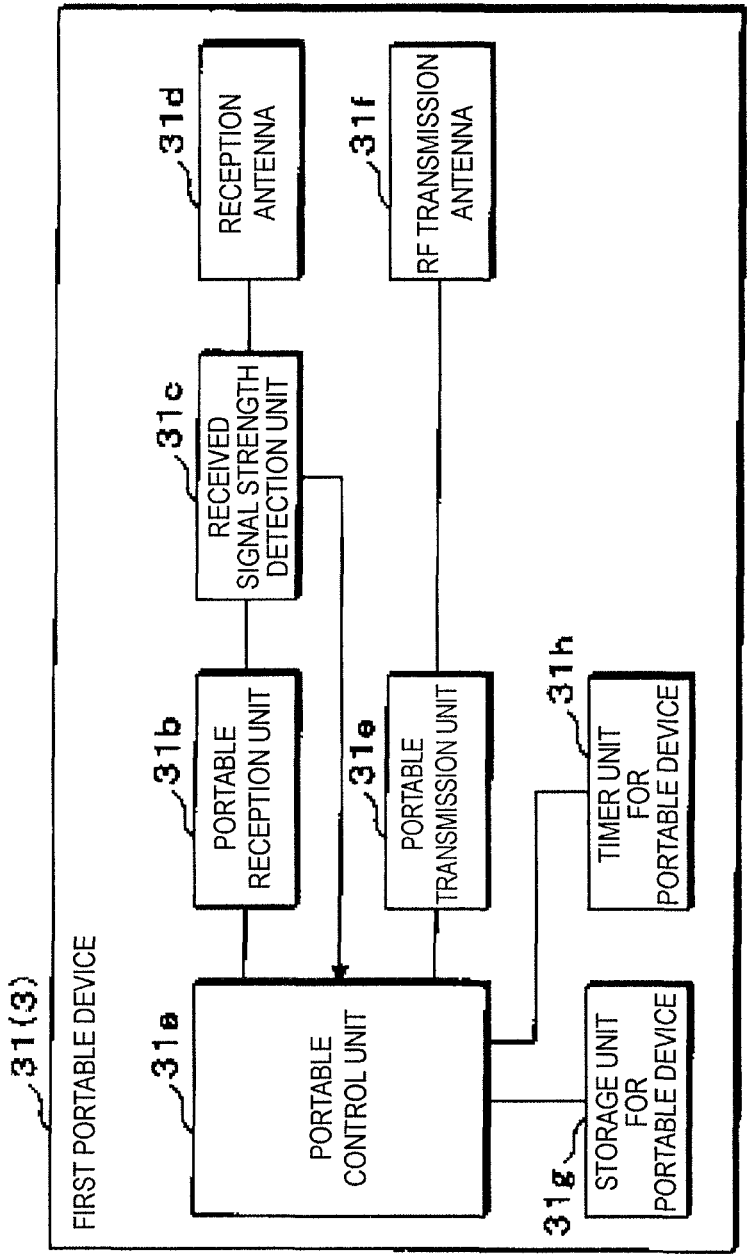
FIG. 3 is a block diagram showing a structural example of a portable device.

FIG. 3 is a block diagram showing a structural example of the portable device 3. The first through sixth portable devices 31, 32, . . . , 36 all have the same structure, so the structure of the first portable device 31 is described and description of the structure of the other portable devices 3 is omitted. The portable device 3 is provided with a portable control unit 31a that controls the actions of the various constituent parts of the portable device 3. The portable control unit 31a is a microcomputer possessing, for example, one or a plurality of CPUs, or a multi-core CPU, or the like. The portable device 3 is provided with a portable reception unit 31b, a portable transmission unit 31e, a storage unit for portable device 31g and a timer unit for portable device 31h.

The portable control unit 31a reads a below-described control program stored in the storage unit for portable device 31g, controls the actions of the various constituent parts, and executes processing that transmits information necessary for the vehicle inside/outside determination of the portable device 3 to the on-board device 1.

The storage unit for portable device 31g is non-volatile memory the same as the storage unit for on-board device 13.

The storage unit for portable device 31g stores a control program for executing processing that transmits to the on-board device 1a response signal or the like including information for accomplishing the vehicle inside/outside determination of the portable device 3, by the portable control unit 31a controlling the actions of the various constituent parts of the portable device 3.

The portable reception unit 31b is connected to a reception antenna 31d via a received signal strength detection unit 31c, receives various signals transmitted from the on-board device 1 using LF-band radio waves, and outputs the signals to the portable control unit 31a. The reception antenna 31d is, for example, a triaxial antenna, and a fixed received signal strength is obtained regardless of the orientation or attitude of the portable device 3 with respect to the vehicle C.

The received signal strength detection unit 31c is a circuit for detecting the received signal strengths of the detection signals received by the reception antenna 31d, and outputs the received signal strengths detected to the portable control unit 31a.

The portable transmission unit 31e is connected to an RF transmission antenna 31f, and transmits response signals corresponding to the detection signals transmitted from the on-board device 1, under control by the portable control unit 31a. The portable transmission unit 31e transmits the response signals using UHF-band radio waves. The UHF band is one example of the radio wave band for transmitting signals, and the band is not limited to this.

The timer unit for portable device 31h starts timing under control by the portable control unit 31a, and provides the timer results to the portable control unit 31a. The timer unit is for measuring the timing of sending response signals.

(Processing Relating to Locking or Unlocking of Vehicle Doors)

Figure 4:
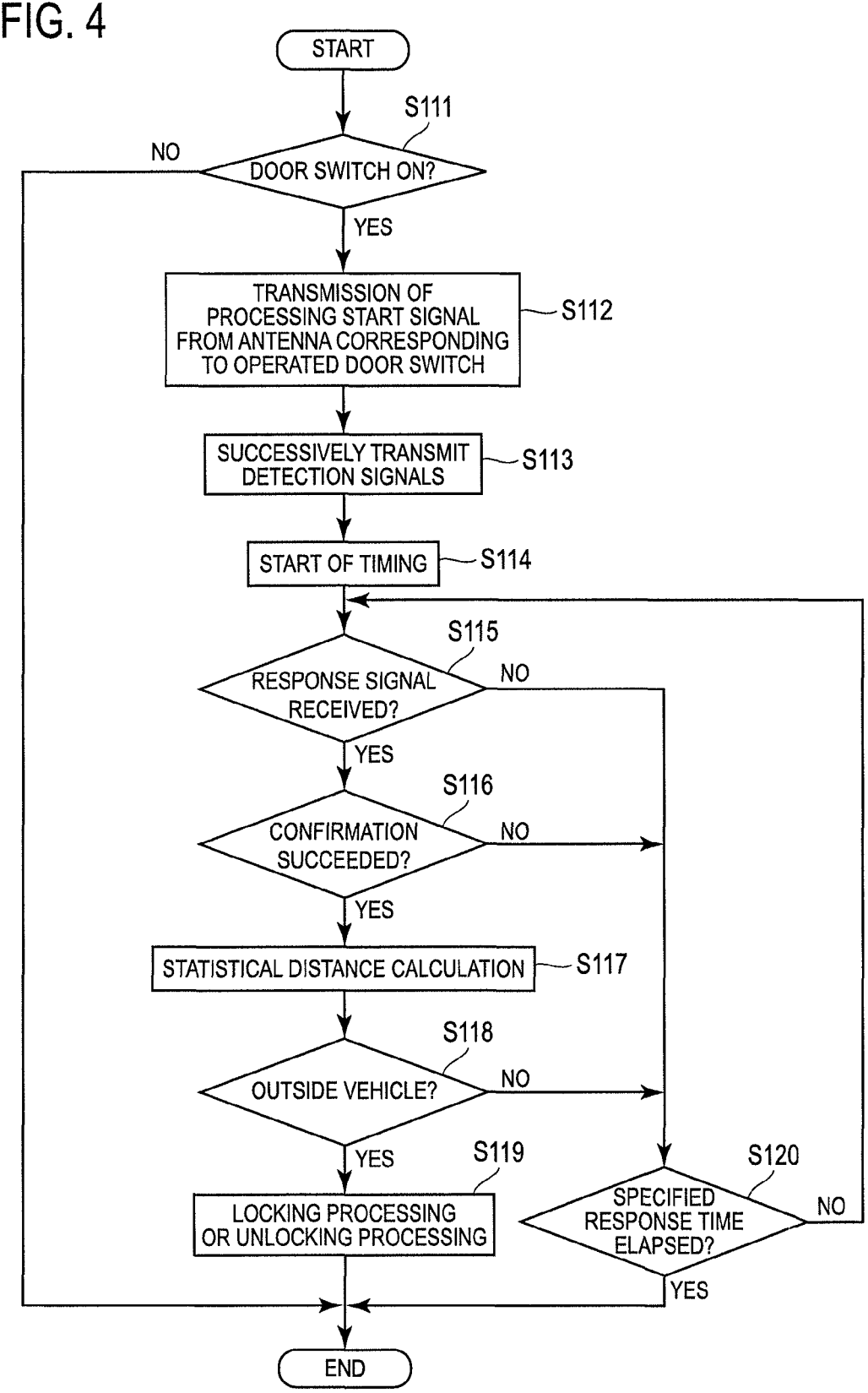
FIG. 4 is a flowchart showing a processing sequence of an on-board device, related to vehicle door locking or unlocking.

FIG. 4 is a flowchart showing a processing sequence of the on-board device 1, related to locking or unlocking a vehicle door. FIG. 5 is a flowchart showing a processing sequence of the portable device 3, related to locking or unlocking a vehicle door. FIG. 6 is an explanatory diagram showing a first example of processing related to locking or unlocking a vehicle door. Below, a process executed by the on-board control unit 10 of the on-board device 1, and a process executed by the portable control unit 31a of the portable device 3, will be described in sequence.

In FIG. 6A, "trigger" is a timing chart showing a trigger signal that starts vehicle inside/outside determination of the portable device 3 in accordance with the first embodiment. A trigger signal input to and output from the on-board device 1 is indicated by a bold line. The signal level of the trigger signal in this embodiment changes depending on the operation state of the door switch. A high-level trigger signal corresponds to a state in which the door switch is not depressed, and a low-level trigger signal corresponds to a state in which the door switch is depressed. In particular, the "trigger" in FIG. 6A shows the operation state of the driver's seat door switch 41. The on-board device 1 starts processing of the vehicle inside/outside determination at the time at which the trigger signal falls from the high level to the low level.

In FIG. 6A, "processing state" is a timing chart showing the locked/unlocked state of the vehicle door. The locked/unlocked state is indicated by the vertical height indicated by the bold line. The state in which the bold line is positioned at the top corresponds to the locked state, and the state in which the bold line is positioned at the bottom corresponds to the unlocked state.

In FIG. 6A, "on-board device" is a timing chart showing the processing execution state of the on-board control unit 10 with which the on-board device 1 is provided. The white rectangular portions indicate time periods in which the on-board control unit 10 executes some kind of processing. The on-board device 1 starts vehicle inside/outside determination processing with the fall of the trigger signal as the trigger, and gives to the on-board transmission unit 12 a command to cause transmission of various types of signals from the various LF transmission antennas 22.

In FIG. 6A, "driver's seat antenna", "passenger's seat antenna", "first in-vehicle antenna", "second in-vehicle antenna" and "back door antenna" are timing charts showing the timing at which signals are transmitted from the various LF transmission antennas 22. The rectangular portions with downward-left hatching indicate the timing at which processing start signal is transmitted from the driver's seat antenna 22a, the passenger's seat antenna 22b, the first in-vehicle antenna 22c, the second in-vehicle antenna 22d or the back door antenna 22e. In the example shown in FIG. 6A, the driver's seat door switch 41 is depressed and a processing start signal is transmitted from the driver's seat antenna 22a. The processing start signal is a signal for causing the start of processing for detecting the positions of the first through sixth portable devices 31, 32, . . . , 36.

In addition, the black rectangular portions indicate the timing at which detection signals for accomplishing a vehicle inside/outside determination of the portable device 3 are transmitted.

In FIG. 6A, "first portable device" to "sixth portable device" are timing charts indicating the timing at which the first portable device 31 through the sixth portable device 36 transmit response signals. The rectangular portions with downward-right hatching indicate response signals transmitted from the first portable device 31 through the sixth portable device 36. In the example shown in FIG. 6A, only the first portable device 31 is present, and response signals are transmitted from the first portable device 31. The response signals are signals including information for detecting the positions of the portable devices 3.

The correlation between the various types of signals and the patterns of the rectangular portions of the timing charts in FIG. 6A described above are the same in other drawings showing timing charts.

The processing sequence of the on-board control unit 10 will be described with reference to FIG. 4. The on-board control unit 10 of the on-board device 1 monitors the door switch operation of the driver's seat door switch 41, the passenger's seat door switch 42 or the back door switch 43, and determines whether or not a door switch is in an on state (step S111). The on state is the state when the door switch is depressed, and the off state is the state when the door switch is not depressed. In FIG. 6A, a high-level trigger signal indicated by "trigger" corresponds to the state of the door switch not being depressed, and a low-level trigger signal corresponds to the state of the door switch being depressed. The on-board control unit 10 can recognize the operation state of the door switch on the basis of the signal level of the trigger signal. When it is determined that the door switch is in an off state (step S111: No), the on-board control unit 10 ends processing. When it is determined that the door switch is in an on state (step S111: Yes), the on-board control unit 10 controls the actions of the on-board transmission unit 12 such that a processing start signal is transmitted from the LF transmission antenna 22 that corresponds to the operated door switch using LF-band radio waves (step S112).

As described below, the processing start signal is one example of a timing start signal for causing timing by the timer unit for portable device 31h to begin in order to measure the timing at which the portable device 3 transmits a first response signal and a second response signal. That is, in the first embodiment, the processing start signal is also used as the timing start signal.

The on-board control unit 10 may control the actions of the on-board transmission unit 12 such that the timing start signal is transmitted as a signal differing from the processing start signal. For example, the on-board device 1 may be comprised such that the processing start signal is transmitted and then the timing start signal is transmitted. In addition, when the processing start signal and the timing start signal are transmitted as separate signals, the on-board device 1 may transmit the processing start signal and the timing start signal from the same LF transmission antenna 22. Because the processing start signal is transmitted from the LF transmission antenna 22, from which the portable device 3 easily receives the processing start signal, by transmitting the timing start signal from the same LF transmission antenna 22, the portable device 3 is enabled to reliably receive the timing start signal.

Next, the on-board control unit 10, without waiting for a response from the portable device 3 and following transmission of the processing start signal, controls the actions of the on-board transmission unit 12 such that detection signals having a prescribed signal strength for detecting the position of the portable device 3 are transmitted successively from the passenger's seat antenna 22b, the first in-vehicle antenna 22c, the second in-vehicle antenna 22d, the back door antenna 22e and the driver's seat antenna 22a at a different timing for each of the plurality of LF transmission antennas 22 (step S113).

The processing actions of step S111 through step S113 will be described with reference to FIG. 6A. As shown in FIG. 6A, the on-board control unit 10 controls the action of the on-board transmission unit 12 by executing the processing indicated in step S112 in response to pressing of a door switch. That is, the on-board control unit 10 starts the processing of the vehicle inside/outside determination with the fall of the trigger signal as a trigger, and gives a control command to the on-board transmission unit 12.

In FIG. 6A, the white rectangular portion shown in the "on-board device" timing chart indicates a portion of the primary processing of the vehicle inside/outside determination, that is the timing at which the on-board control unit 10 executes the processing of step S112 and step S113.

The on-board transmission unit 12 accomplishes transmission of the processing start signals and the detection signals from the transmission antennas 22, under control by the on-board control unit 10. In the first embodiment shown in FIG. 6A, a case in which the driver's seat door switch 41 is operated is shown. In this case, the on-board transmission unit 12 transmits a processing start signal (the rectangular portion with downward-left hatching) from the driver's seat antenna 22a. The processing start signal is a signal for causing processing for detecting the position of the portable device 3 to start. For example, the processing start signal includes information for causing a portable device 3 in a sleep state to wake up, and information necessary for confirmation of the on-board device 1 in the portable device 3, and the like. In addition, the processing start signal includes information required for a vehicle inside/outside determination of the portable device 3. For example, the processing start signal includes request information such as information for confirming the legitimacy of the on-board device 1 that is the transmission source of the processing start signal, and information necessary for accomplishing the vehicle inside/outside determination of the portable device 3.

For example, when the passenger's seat door switch 42 is operated, the on-board transmission unit 12 transmits a processing start signal from the passenger's seat antenna 22*b*. When the back door switch 43 is operated, the on-board transmission unit 12 transmits a processing start signal from the back door antenna 22*e*. In other words, the processing start signal is transmitted from an LF transmission antenna 22 close to the operated door switch.

Next, the on-board transmission unit 12 transmits detection signals (the black-shaded rectangular portion) successively from the plurality of LF transmission antennas 22, with timing that differs for each of the plurality of LF transmission antennas 22. The detection signals are signals used in the vehicle inside/outside determination of the portable device 3. The timing of transmitting signals from each of the LF transmission antennas 22 is determined in advance. For example, the on-board device 1 makes the transmission time of the processing start signal a reference time and causes signals to be transmitted from each of the LF transmission antennas 22 with a predetermined timing that differs for each of the LF transmission antennas 22.

In this embodiment, one characteristic is that the LF transmission antenna 22 that sent the processing start signal (here, the driver's seat antenna 22*a*) transmits the detection signal last. When the processing start signal is transmitted from one LF transmission antenna 22 and immediately thereafter the detection signal is transmitted from the same LF transmission antenna 22, a burden is imposed on the LF transmission antenna 22. However, by having a structure such that when the processing start signal is transmitted from one LF transmission antenna 22, the detection signal is transmitted from the other LF transmission antennas 22 and lastly the detection signal is transmitted from the one LF transmission antenna 22, it is possible to prevent the burden of signal transmission from being concentrated on the one LF transmission antenna 22.

However, in the present invention, the order of the plurality of LF transmission antennas 22 transmitting the detection signal is not particularly limited as described above, and it is possible to set an arbitrary order.

Returning to FIG. 4, the processing sequence of the on-board control unit 10 will be described. The on-board control unit 10 that has finished processing in step S113 starts timing a standby time waiting for a response from the portable device 3, that is a timeout time, through the timer unit for on-board device 14 (step S114). The timing of starting timing by the timer unit for on-board device 14 is not particularly limited as long as it is possible to execute the timeout process. For example, timing may start from the point in time when the door switch becomes in an on state or from the point in time when transmitting of the processing start signal starts or ends.

Next, the on-board control unit 10 determines whether or not the on-board reception unit 11 has received a response signal transmitted from any one of the portable devices 3 out of the first through sixth portable devices 31, 32, . . . , 36 (step S115). As described below, a portable device 3 that has received the processing start signal receives detection signals transmitted from each of the LF transmission antennas 22 and detects the received signal strengths of each of the detection signals received. The portable device 3 stores in advance the timing at which the detection signals are to be transmitted from each of the LF transmission antennas 22, and thus can identify the received signal strengths of the detection signals to be transmitted from each of the LF transmission antennas 22 by detecting the received signal strengths of the detection signals received by the reception antenna 31*d* at the prescribed timing. Furthermore, the portable device 3 confirms the on-board device 1 that is the transmission source of the processing start signal, and when confirmation is successful, transmits to the on-board device 1 a response signal including information on the received signal strength detected and information for confirming the portable device 3 on the on-board device 1 side. The response signal is transmitted twice from the portable device 3, as shown in FIG. 6A. The rectangular portions with downward-right hatching indicate response signals transmitted from the portable device 3. In the example shown in FIG. 6A, a case is shown in which response signals are transmitted from the first portable device alone. The response signal transmitted the first time is the first response signal, and the response signal transmitted the second time is the second response signal.

In addition, the response signals in some cases are transmitted from all of the first through sixth portable devices 31, 32, . . . , 36, and in some cases are transmitted from a part of the portable devices 3 out of the first through sixth portable devices 31, 32, . . . , 36, depending on the position at which the first through sixth portable devices 31, 32, . . . , 36 exist. However, because each of the portable devices 3 transmits response signals using radio waves in the same frequency band, when response signals are simultaneously transmitted from two or more of the portable devices 3, there are cases in which the on-board device 1 cannot receive the response signals normally. Accordingly, in step S115, the on-board control unit 10 determines whether or not response signals transmitted from the portable devices 3 were received normally.

When it is determined that response signal transmitted from a portable device 3 was received (step S115: Yes), the on-board control unit 10 confirms the portable device 3 based on the information contained in the response signals and determines whether or not confirmation was successful (step S116). When it is determined that confirmation was successful (step S116: Yes), the on-board control unit 10 calculates the statistical distance between (i) the portable device 3 that is the transmission source of the response signal and (ii) the inside of the vehicle and the outside of the vehicle, based on the information on the received signal strengths included in the response signal received (step S117).

The received signal strengths included in the response signal are a vector. The components of the vector are the respective received signal strengths of the plurality of detection signals transmitted from each of the LF transmission antennas 22. In this first embodiment, the vector is five-dimensional, because the vector has as components the received signal strengths respectively corresponding to the plurality of detection signals transmitted from the five LF transmission antennas 22. The storage unit for on-board device 13 of the on-board device 1 stores, for example, the statistical values of the average vector, a variance matrix or an inverse variance matrix, or the like of the received signal strengths found on the basis of a sample group of the received signal strengths detected by the portable device 3 at a plurality of locations inside the vehicle. The on-board control unit 10 calculates the statistical distance between (i) the sample group of received signal strengths detected by the portable device 3 that is inside the vehicle, and (ii) the vector of the received signal strengths included in the response signal received in step S115. In other words, a value corresponding to the degree of similarity between (i) the received signal strengths included in the response signal received in step S115 and (ii) the received signal strengths detected by a portable device 3 disposed inside the vehicle is calculated. The statistical distance is, for example, a Mahalanobis distance, but is not particularly limited.

Similarly, the storage unit for on-board device 13 of the on-board device 1 stores the statistical values of the average vector, a variance matrix or an inverse variance matrix, or the like of the received signal strengths found on the basis of a sample group of the received signal strengths detected by the portable device 3 at a plurality of locations outside the vehicle. The on-board control unit 10 calculates the statistical distance between (i) the sample group of received signal strengths detected by the portable device 3 outside the vehicle, and (ii) the vector of the received signal strengths included in the response signal received in step S115.

The on-board control unit 10 that has finished the processing of step S117 determines whether or not the portable device 3 that is the transmission source of the response signals received in step S115 is outside the vehicle, on the basis of the statistical distance calculated in step S117 (step S118). That is, the on-board control unit 10 identifies the position of the portable device 3 through the processing of step S117 and step S118. The on-board control unit 10 determines that the portable device 3 is outside the vehicle when the statistical distance between the received signal strengths included in the response signal and the sample group of received signal strengths detected by a portable device 3 that is outside the vehicle is shorter than the statistical distance between the received signal strengths and the sample group of received signal strengths detected by a portable device 3 inside the vehicle. When it is determined that the portable device 3 is outside the vehicle (step S118: Yes), the on-board control unit 10 executes vehicle door locking processing or unlocking processing (step S119) and ends processing. When the door switch is operated with the vehicle door in an unlocked state, the on-board control unit 10 executes processing to lock the vehicle door, and when the door switch is operated with the vehicle door in a locked state, the on-board control unit 10 executes processing to unlock the vehicle door. More specifically, the on-board control unit 10 of the on-board device 1 executes processing to transmit to an undepicted door ECU a signal ordering door locking or unlocking.

In this embodiment, when it is determined that even one of the portable devices 3 is outside the vehicle, the on-board control unit 10 executes vehicle door locking processing or unlocking processing without waiting for response signals from the other portable devices 3.

When it is determined in step S115 that a response signal has not been received (step S115: No), when it is determined in step S116 that confirmation has failed (step S116: No), or when it is determined in step S118 that the portable devices 3 are inside the vehicle 3 (step S118: No), the on-board control unit 10 determines whether or not a prescribed response time has elapsed since timing by the timer unit for on-board device 14 started (step S120). When the prescribed response time has not elapsed (step S120: No), the on-board control unit 10 returns processing to step S115 and executes the steps beginning with receiving response signals from the other portable devices 3 and continuing through the vehicle inside/outside determination. When it is determined that the prescribed response time has elapsed (step S120: Yes), the on-board control unit 10 ends processing.

The method of the vehicle inside/outside determination for portable devices 3 described above is one example, and it is possible to apply to the present invention an arbitrary method that enables accomplishment of a vehicle inside/outside determination for portable devices 3 on the basis of detection signals from the plurality of LF transmission antennas 22.

Next, processing by the portable devices 3 is described with reference to FIG. 5. Processing by the first through sixth portable devices 31, 32, . . . , 36 differs only in the timing of transmitting response signals, so here processing by the first portable device 31 is described. The portable control unit 31*a* of the portable device 3 monitors signals received by the portable reception unit 31*b*, and determines whether or not a processing start signal transmitted from the on-board device 1 was received by the portable reception unit 31*b* (step S131). When it is determined that a processing start signal has not been received (step S131: No), the portable control unit 31*a* ends processing. When it is determined that a processing start signal was received (step S131: Yes), the portable control unit 31*a* starts timing by the timer unit for portable device 31*h* (step S132).

In the first embodiment, the point in time at which the processing start signal was received is taken to be the timing start time by the timer unit for portable device 31*h*, but as discussed above, in the case of a structure in which the timing start signal is transmitted from the on-board device 1 separate from the processing start signal, the point in time when the timing start signal was received may be taken as the timing start time. Specifically, the structure may be such that the on-board control unit 31*a* monitors the signals received by the portable reception unit 31*b*, and when it is determined that a timing start signal was received by the portable reception device 31*b*, timing by the timer unit for portable device 31*h* starts.

In addition, the structure may be such that the portable control unit 31*a* monitors signals that the portable reception unit 31*b* receives, and when it is determined that the portable reception unit 31*b* has received a detection signal, timing by the timer unit for portable device 31*h* starts. In this case, it is preferable for a detection signal transmitted from the same LF transmission antenna 22 as the LF transmission antenna 22 that transmitted the processing start signal to function as the timing start signal. When a detection signal transmitted from an LF transmission antenna 22 differing from the LF transmission antenna 22 that transmitted the processing start signal is taken as the timing start signal, there is a possibility that the portable device 3 that received the processing start signal cannot receive the detection signal that functions as the timing start signal. When the detection signal cannot be received, the portable device 3 cannot start timing. The processing start signal is transmitted from the LF transmission antenna 22 from which it basically is easy for the portable device 3 to receive the processing start signal, so by having the detection signal transmitted from the same LF transmission antenna 22 as the LF transmission antenna 22 that transmitted the processing start signal function as the timing start signal, it is possible to increase the possibility that the portable device 3 that received the processing start signal can also receive the detection signal that functions as the timing start signal.

Next, the portable control unit 31*a* detects in the received signal strength detection unit 31*c* the received signal strengths of the detection signals transmitted from each of the LF transmission antennas 22 of the on-board device 1 (step S133). The timing at which the detection signals are transmitted from each of the LF transmission antennas 22 is predetermined. Accordingly, the portable control unit 31*a* can detect the received signal strengths of the detection signals transmitted from each of the LF transmission antennas 22, through acquiring the received signal strengths detected by the received signal strength detection unit 31*c* with the specific timing timed by the timer unit for portable device 31*h*. Furthermore, the portable control unit 31*a* confirms whether or not the transmission source of the processing start signal and the like is a legitimate on-board device 1, on the basis of information included in the processing start signal received earlier, and determines whether or not confirmation was successful (step S134). When it is determined that confirmation failed (step S134: No), the portable control unit 31*a* ends processing.

When it is determined that confirmation was successful (step S134; Yes), the portable control unit 31*a* determines whether or not a first prescribed time has elapsed from when the processing start signal was received (step S135). The first prescribed time is common among the first through sixth portable devices 31, 32, . . . , 36. When it is determined that the first prescribed time has not elapsed (step S135: No), the portable control unit 31*a* again executes the processing of step S135, and waits until the first prescribed time has elapsed. When it is determined that the first prescribed time has elapsed (step S135: Yes), the portable control unit 31*a* causes the portable transmission unit 31*e* to transmit the first response signal (step S136). The portable transmission unit 31*e* transmits the first response signal from the RF transmission antenna 31*f* using UHF-band radio waves. The first response signal includes information about the received signal strengths detected in step S133, information for confirming on the on-board device 1 side the legitimacy of the portable device 3 that is the transmission source of the information, and the like.

The other portable devices 3 besides the first portable device 31 also transmit the first response signal when roughly the same first prescribed time has elapsed. Accordingly, in a case such as when the user holds a plurality of portable devices 3, the first response signal is transmitted from the plurality of portable devices 3 with the same timing. Consequently, there are cases in which the on-board device 1 fails to receive the first response signal (see FIG. 11A). Hence, the portable control unit 31*a* executes the following processing.

The portable control unit 31*a* determines whether or not a second prescribed time has elapsed from when the processing start signal was received (step S137). The second prescribed time differs for each of the first through sixth portable devices 31, 32, . . . , 36. In the first embodiment, the description will assume that the second prescribed time becomes longer in the order of the first portable device 31, the second portable device 32, the third portable device 33, the fourth portable device 34, the fifth portable device 35 and the sixth portable device 36. The second prescribed time for each of the portable devices 3 is set such that the interval during which transmission and reception of the second response signal is accomplished between one of the portable devices 3 and the on-board device 1 does not overlap with the interval during which transmission and reception of the second response signal is accomplished between another of the portable devices 3 and the on-board device 1, and such that the sixth portable unit 36 can transmit the second response signal to the on-board device 1 as early as possible. When it is determined that the second prescribed time has not elapsed (step S137: No), the portable control unit 31*a* again executes the processing of step S137 and waits until the second prescribed time has elapsed. When it is determined that the second prescribed time has elapsed (step S137: Yes), the portable control unit 31*a* causes the portable transmission unit 31*e* to transmit the second response signal (step S138) and ends processing. The second response signal, like the first response signal, includes information about the received signal strengths detected in step S133, and information for confirming the legitimacy of the portable device 3 that is the transmission source of the information.

The first response signal and the second response signal may contain substantially the same information relating to the received signal strengths, or the first and second response signals may include information that partially differs.

Figure 11A:
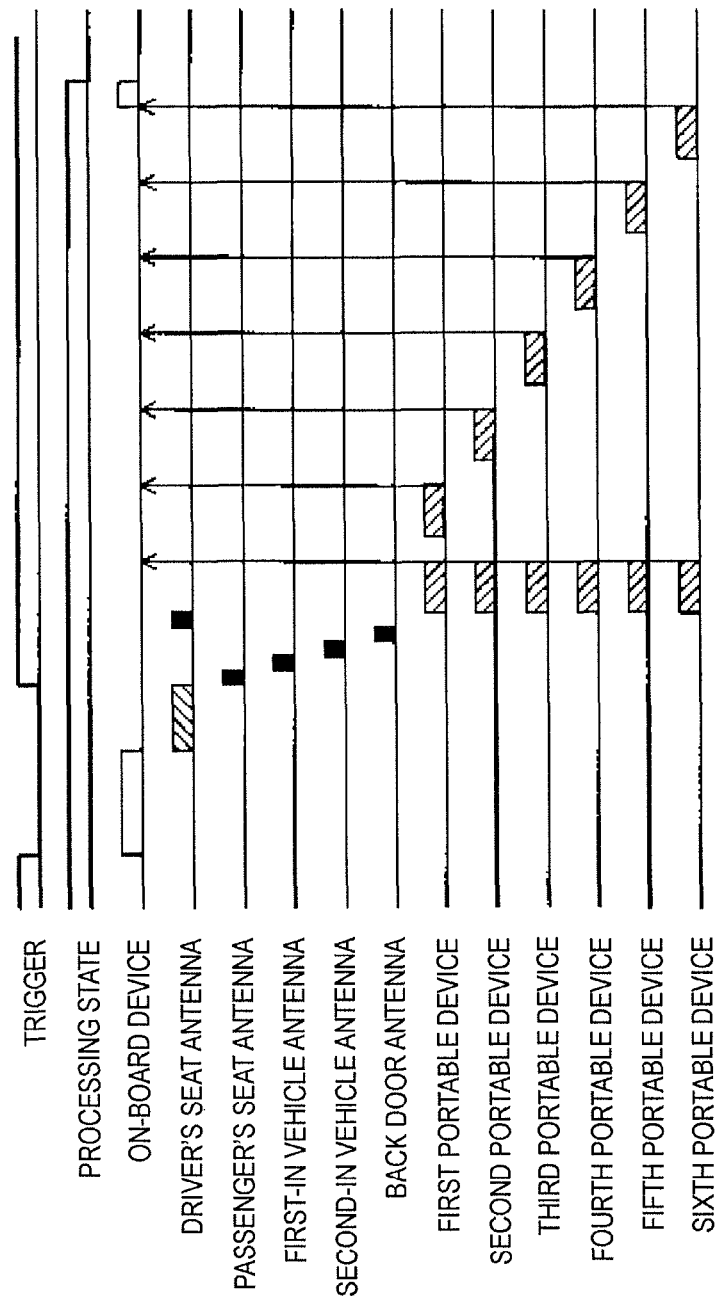
FIG. 11 is an explanatory diagram showing a sixth example of processing related to vehicle door locking or unlocking.

When the portable device 3 structured in this manner has received a processing start signal, the received signal strengths of the detection signals transmitted from each of the LF transmission antennas 22 are detected, the first response signals are transmitted at a common timing for each of the portable devices 3 and the second response signals are transmitted with different timing for each of the portable devices 3 (see FIG. 11A).

In the example described with reference to FIG. 4 and FIG. 5, an example was described in which the on-board control unit 10 executes a statistical distance calculation and a vehicle inside/outside determination for the portable devices 3, but the structure may be such that the primary processing of the statistical distance calculation and the vehicle inside/outside determination is executed by the portable device 3 and a response signal including the results of the vehicle inside/outside determination is transmitted to the on-board device 1. Specifically, as information for the vehicle inside/outside determination, the storage unit for portable device 31*g* stores (i) the statistical values of an average vector, a variance matrix or an inverse variance matrix, or the like of the received signal strengths found on the basis of the sample group of received signal strengths detected by the portable device 3 at a plurality of locations inside the vehicle, and (ii) the statistical values of an average vector, a variance matrix or an inverse variance matrix, or the like of the received signal strengths found on the basis of the sample group of received signal strengths detected by the portable device 3 at a plurality of locations outside the vehicle. The portable control unit 31*a* executes the same processing as in step S117 and step S118 after the received signal strengths of the detection signals transmitted from each of the LF transmission antennas 22 in step S133 are detected by the received signal strength detection unit 31*c*. That is, the portable control unit 31*a* calculates the statistical distances between (i) the inside of the vehicle and the outside of the vehicle and (ii) the portable device 3 itself, on the basis of the information about the received signal strengths. Furthermore, the portable control unit 31*a* determines whether or not the unit itself is outside the vehicle, on the basis of the calculated statistical distances. That is, the portable control unit 31*a* determines its own position. The portable control unit 31*a* determines that the unit itself is outside the vehicle if the statistical distance between (i) the detected received signal strengths and (ii) the sample group of received signal strengths detected by a portable device 3 outside the vehicle is shorter than the statistical distance between (i) the detected received signal strengths and (ii) the sample group of received signal strengths detected by a portable device 3 inside the vehicle. Similarly, the portable control unit 31*a* determines that the unit itself is inside the vehicle when the statistical distance between (i) the detected received signal strengths and (ii) the sample group of received signal strengths detected by a portable device 3 inside the vehicle is short compared to the statistical distance between (i) the detected received signal strengths and (ii) the sample group of received signal strengths detected by a portable device 3 outside the vehicle. Below, the portable control unit 31a transmits the first response signal and the second response signal including the results of the vehicle inside/outside determination to the on-board device 1 by means of the portable transmission unit 31e, by executing the same processing as in step S134 through step S138 of FIG. 5.

The on-board control unit 10 receives the response signals transmitted from the portable device 3 via the on-board reception unit 11 (step S115: Yes), confirms the portable device 3 on the basis of the information included in the response signals, and determines whether or not confirmation was successful (step S116). When it is determined that confirmation was successful (step S116: Yes), the on-board control unit 10 determines whether or not the portable device 3 is inside the vehicle, on the basis of the results of the vehicle inside/outside determination included in the response signals (step S118). In the structure in which the portable device 3 accomplishes the vehicle inside/outside determination, the on-board control unit 10 does not execute the processing of step S117. When it is determined that the portable device 3 is outside the vehicle (step S118: Yes), the on-board control unit 10 executes vehicle door locking processing or unlocking processing (step S119), and ends processing.

When it is determined in step S115 that a response signal has not been received (step S115: No), when it is determined in step S116 that confirmation has failed (step S116: No), or when it is determined in step S118 that the portable device 3 is inside the vehicle (step S118: No), the on-board control unit 10 determines whether or not the prescribed response time has elapsed from when timing was started by the timer unit for on-board device 14 (step S120). When the prescribed response time has not elapsed (step S120: No), the on-board control unit 10 returns processing to step S115 and executes receiving response signals from the other portable devices 3 through the vehicle inside/outside determination. When it is determined that the prescribed response time has elapsed (step S120: Yes), the on-board control unit 10 ends processing.

Next, operation of an on-board communication system thus configured is described.

First Example

The first example is a case in which the first portable device 31 is outside the vehicle, as shown in FIG. 6B. When the user has depressed the driver's seat door switch 41, as shown in FIG. 6A the on-board device 1 transmits a processing start signal from the driver's seat antenna 22a, and then detection signals for the vehicle inside/outside determination are successively transmitted from each of the LF transmission antennas 22 with timing that differs for each of the plurality of LF transmission antennas 22. Because the user is holding the first portable device 31, the first portable device 31 receives the processing start signal, measures the received signal strengths of the signals transmitted from each of the LF transmission antennas 22, and transmits (i) a first response signal including information about the received signal strengths measured, and (ii) a second response signal, in succession to the on-board device 1. Because only the first portable device 31 exists inside the vehicle or in the vicinity of outside the vehicle, the on-board device 1 can receive normally the first response signal transmitted from the first portable device 31. Accordingly, the on-board device 1 accomplishes vehicle inside/outside determination for the first portable device 31 on the basis of the first response signal transmitted from the first portable device 31. In the first example, because the first portable device 31 is outside the vehicle, the on-board control unit 10 of the on-board device 1 executes vehicle door locking processing or unlocking processing on the basis of the first response signal transmitted first from the first portable device 31. In particular, when the driver's seat door switch 41 is depressed with the vehicle door in a locked state as shown in FIG. 6A, the vehicle door is unlocked. The same is true in FIG. 7 through FIG. 11 below.

Second Example

Figure 7A:
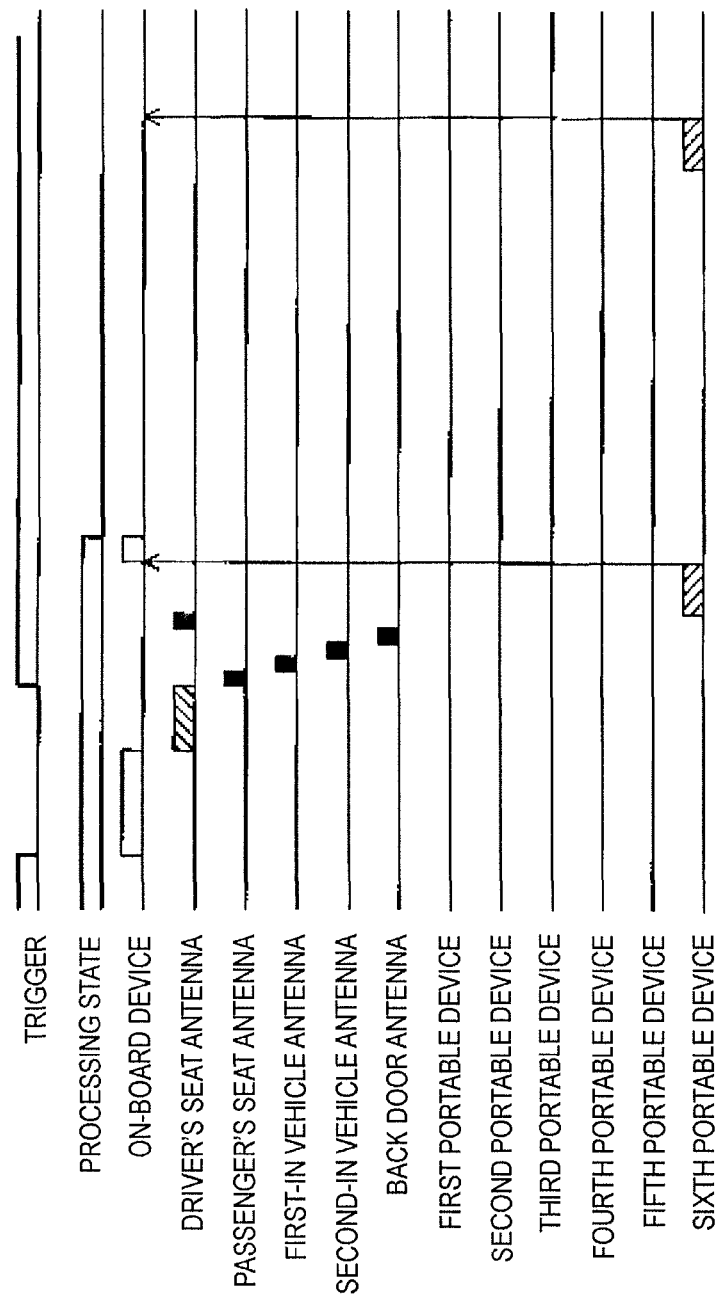
FIG. 7 is an explanatory diagram showing a second example of processing related to vehicle door locking or unlocking.
Figure 7B:
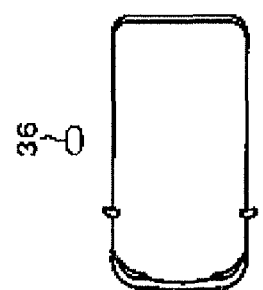

FIG. 7 is an explanatory diagram showing a second example of processing related to vehicle door locking or unlocking. The second example is a case in which the sixth portable device 36 is outside the vehicle, as shown in FIG. 7B. The sequence of transmitting and receiving the processing start signal and detection signals for the vehicle inside/outside determination is the same as in the first example.

When communication is accomplished separately with each of the portable devices as in the Background Technology section, the tendency is for communication with the sixth portable device 36 to occur last among the plurality of portable devices 3, so in cases such as this example in which only the sixth portable device 36 is present, time is required before the prescribed processing is executed. In contrast, with the present invention, detection signals that the plurality of portable devices 3 can receive in common are used, so even in cases in which only the sixth portable device 36 is present, it is possible to shorten the time necessary for communication.

In addition, the sixth portable device 36 transmits the first response signal and the second response signal in succession to the on-board device 1, but the transmission timing of the second response signal is the latest timing among the first through sixth portable devices 31, 32, . . . 36. However, because only the sixth portable device 36 exists inside the vehicle or near the outside of the vehicle, the on-board device 1 can receive normally the first response signal transmitted from the sixth portable device 36. Accordingly, the on-board device 1 can accomplish a vehicle inside/outside determination for the sixth portable device 36 and execute vehicle door locking processing or unlocking processing on the basis of the first response signal transmitted from the sixth portable device 36. That is, the on-board device 1 can execute door locking processing or unlocking processing on the basis of the first response signal transmitted first, without waiting for the second response signal transmitted from the sixth portable device 36. The timing for transmitting the first response signal is the same as that of the first portable device 31, so even when the user is holding the sixth portable device 36, the on-board device 1 can lock or unlock the vehicle door with the same processing time as when the user is holding the first portable device 31. Cases where the second portable device 32, the third portable device 33, the fourth portable device 34 and the fifth portable device 35 are used are also the same, and the on-board device 1 can quickly lock or unlock the vehicle door.

Third Example

FIG. 8 is an explanatory diagram showing a third example of processing related to vehicle door locking or unlocking.

Figure 8A:
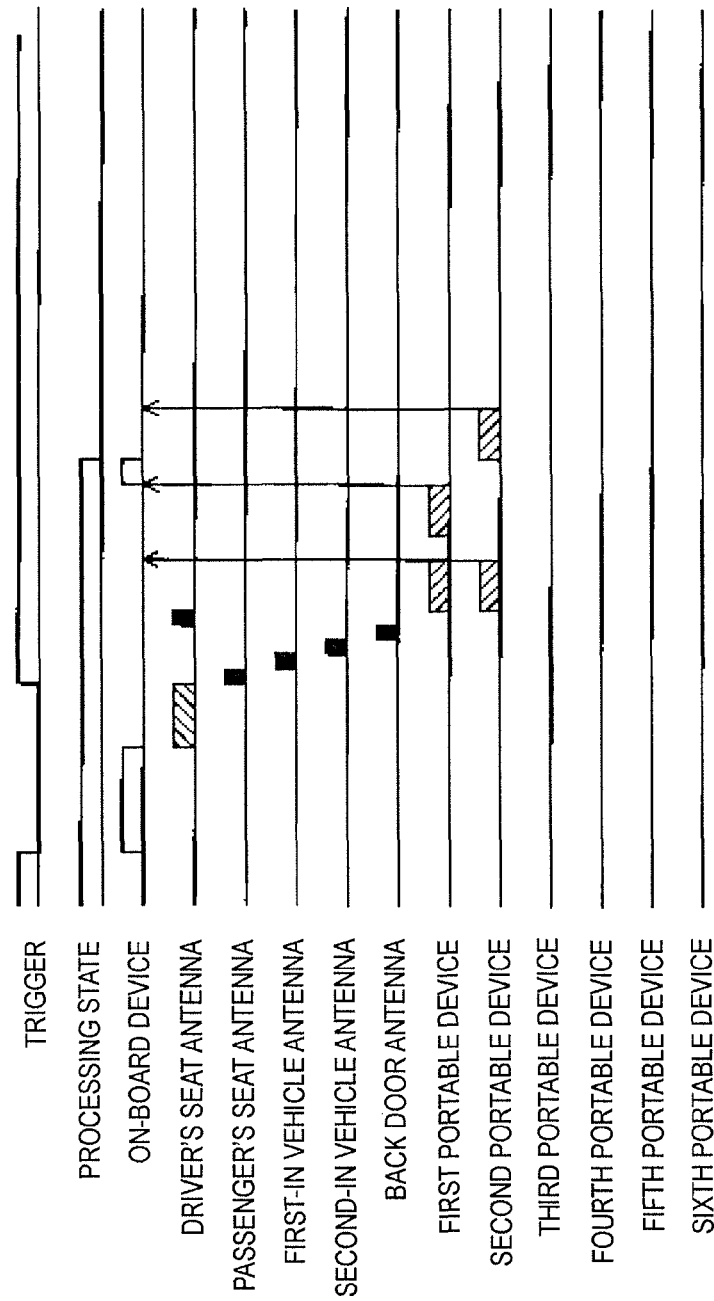
FIG. 8 is an explanatory diagram showing a third example of processing related to vehicle door locking or unlocking.
Figure 8B:
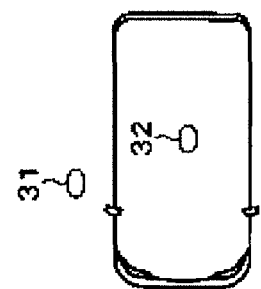

The third example is a case in which the first portable device 31 is outside the vehicle and the second portable device 32 is inside the vehicle, as shown in FIG. 8B. The sequence of transmitting and receiving the processing start signal and the detection signals for vehicle inside/outside determination is the same as in the first example. However, as shown in FIG. 8A, the first portable device 31 and the second portable device 32 transmit the first response signal at the same timing. Furthermore, following transmission of the first response signal, the first portable device 31 transmits the second response signal and the second portable device 32 transmits the second response signal after transmitting and receiving of the second response signal is accomplished between the first portable device 31 and the on-board device 1. In this third example, both the first portable device 31 and the second portable device 32 are present inside the vehicle or near the outside of the vehicle, and because the first response signal is sent with the same timing from the first portable device 31 and the second portable device 32, the on-board device 1 in some cases fails to receive the first response signal.

However, the on-board device 1 can receive the second response signal transmitted from the first portable device 31. Accordingly, the on-board device 1 can accomplish the vehicle inside/outside determination for the first portable device 31 on the basis of the second response signal transmitted from the first portable device 31. In the third example, the first portable device 31 is outside the vehicle, so vehicle door locking processing or unlocking processing is executed. That is, the on-board device 1 can execute door locking processing or unlocking processing on the basis of the second response signal transmitted earlier from the first portable device 31, without waiting for the second response signal transmitted from the second portable device 32. When the driver's seat door switch 41 is depressed with the vehicle door in a locked state as shown in FIG. 8A, the vehicle door is unlocked.

Fourth Example

FIG. 9 is an explanatory diagram showing a fourth example of processing related to vehicle door locking or unlocking. The fourth example is a case in which the first portable device 31 is inside the vehicle and the second portable device 32 is outside the vehicle, as shown in FIG. 9B. The sequence of transmitting and receiving the processing start signal, detection signals for vehicle inside/outside determination and response signals is the same as in the third example. In the fourth example, both the first portable device 31 and the second portable device 32 are present inside the vehicle or near the outside of the vehicle, and the first response signal is transmitted from the first portable device 31 and the second portable device 32 at the same timing, as shown in FIG. 9A, so in some cases the on-board device 1 fails to receive the first response signal. However, the on-board device 1 can receive the second response signal transmitted from the first portable device 31, and can accomplish a vehicle inside/outside determination for the first portable device 31 on the basis of the second response signal. In the fourth example, the first portable device 31 is inside the vehicle, so vehicle door locking or unlocking is not performed. Next, the on-board device 1 receives the second response signal transmitted from the second portable device 32 and can accomplish a vehicle inside/outside determination for the second portable device 32 on the basis of the second response signal received. Because the second portable device 32 is present outside the vehicle, the on-board device 1 can execute vehicle door locking processing or unlocking processing on the basis of the second response signal from the second portable device 32. In the fourth example, the process is slower than in the third example, but at the latest, locking processing or unlocking processing can be executed on the basis of the second response signal from the second portable device 32. When the driver's seat door switch 41 is depressed with the vehicle door in a locked state as shown in FIG. 9A, the vehicle door is unlocked.

Fifth Example

FIG. 10 is an explanatory diagram showing a fifth example of processing related to vehicle door locking or unlocking. The fifth example is a case in which the first portable device 31 is inside the vehicle and the sixth portable device 36 is outside the vehicle, as shown in FIG. 10B. The sequence of transmitting and receiving the processing start signal, detection signals for vehicle inside/outside determination and response signals is the same as in the fourth example. In the fifth example, both the first portable device 31 and the sixth portable device 36 are present inside the vehicle or near the outside of the vehicle, and the first response signal is transmitted from the first portable device 31 and the sixth portable device 36 at the same timing, as shown in FIG. 10A, so in some cases the on-board device 1 fails to receive the first response signals. However, the on-board device 1 can receive the second response signal transmitted from the first portable device 31, and can accomplish a vehicle inside/outside determination for the first portable device 31 on the basis of the second response signal. In the fifth example, the first portable device 31 is inside the vehicle, so vehicle door locking or unlocking is not performed. Next, the on-board device 1 receives the second response signal transmitted from the sixth portable device 36 and can accomplish a vehicle inside/outside determination for the sixth portable device 36 on the basis of the second response signal received. Because the sixth portable device 36 is present outside the vehicle, the on-board device 1 can execute vehicle door locking processing or unlocking processing on the basis of the second response signal from the sixth portable device 36. When the driver's seat door switch 41 is depressed with the vehicle door in a locked state as shown in FIG. 10A, the vehicle door is unlocked. The fifth example is a case in which the sixth portable device 36, whose transmission timing of the second response signal is most delayed, is outside the vehicle, but at the latest, locking processing or unlocking processing can be executed on the basis of the second response signal from the sixth portable device 36. The fifth example is an example in which locking processing or unlocking processing is the most delayed in the first embodiment, but because the structure successively transmits the processing start signal and the detection signals for vehicle inside/outside determination to each of the portable devices 3 with different timing for each of the plurality of LF transmission antennas 22, compared to a conventional on-board communication system, it is possible to more efficiently accomplish vehicle inside/outside determination and execute locking processing or unlocking processing. That is, compared to a conventional on-board communication system such that for each of the portable devices 3, the presence or absence of the portable device 3 is confirmed, detection and transmitting and receiving of the received signal strengths is accomplished and a vehicle inside/outside determination is accomplished, it is possible to accomplish vehicle inside/outside determinations for each of the portable devices 3 more quickly.

Sixth Example

Figure 11B:
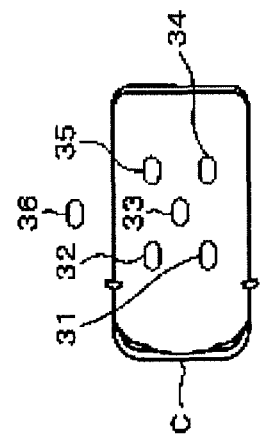

FIG. 11 is an explanatory diagram showing a sixth example of processing related to vehicle door locking or unlocking. As shown in FIG. 11B, the sixth example is a case in which the first through fifth portable devices 31, 32, . . . , 35 are inside the vehicle and the sixth portable device 36 is outside the vehicle. The sequence of transmitting and receiving the processing start signal, detection signals for vehicle inside/outside determination and response signals is the same as in the fifth example. In the sixth example, the first through sixth portable devices 31, 32, . . . , 36 are present inside the vehicle or near the outside of the vehicle, and the first response signal is transmitted from the first through sixth portable devices 31, 32, . . . , 36 at the same timing, as shown in FIG. 11A, so in some cases the on-board device 1 fails to receive the first response signal. However, the on-board device 1 can receive the second response signal transmitted from the first portable device 31, and can accomplish a vehicle inside/outside determination for the first portable device 31 on the basis of the second response signal. In the sixth example, the first portable device 31 is inside the vehicle, so vehicle door locking or unlocking is not performed. Similarly, a vehicle inside/outside determination is accomplished for the second through fifth portable devices 32, 33, 34 and 35, but all of these are present inside the vehicle, so vehicle door locking or unlocking is not performed. Finally, the on-board device 1 receives the second response signal transmitted from the sixth portable device 36 and can perform a vehicle inside/outside determination for the sixth portable device 36 on the basis of the second response signal received. Because the sixth portable device 36 is present outside the vehicle, the on-board device 1 can execute vehicle door locking processing or unlocking processing on the basis of the second response signal from the sixth portable device 36. The sixth example is a case in which the sixth portable device 36, whose transmission timing of the second response signal is most delayed, is outside the vehicle, but at the latest, locking processing or unlocking processing can be executed on the basis of the second response signal from the sixth portable device 36. The sixth example, like the fifth example, is an example in which locking processing or unlocking processing is the most delayed, but because the structure successively transmits the processing start signal and the detection signals for vehicle inside/outside determination to each of the portable devices 3 with different timing for each of the plurality of LF transmission antennas 22, compared to a conventional on-board communication system, it is possible to more efficiently accomplish vehicle inside/outside determination and execute locking processing or unlocking processing. When the driver's seat door switch 41 is depressed with the vehicle door in a locked state as shown in FIG. 11A, the vehicle door is unlocked.

With the on-board communication system, on-board device 1 and portable devices 3 according to the first embodiment, it is possible to shorten the time needed for position detection of the portable devices 3. Specifically, even when a plurality of portable devices 3 are present in the vicinity of the vehicle C, it is possible to efficiently accomplish communication between the on-board device 1 and the portable devices 3 and accomplish vehicle inside/outside determinations for the portable devices 3, and to execute vehicle door locking processing or unlocking processing.

In the first embodiment, the on-board transmission unit 12 successively transmits signals for determining the positions of the portable devices 3 from the plurality of LF transmission antennas 22 disposed in the vehicle C with timing that differs for each of the plurality of LF transmission antennas 22, without waiting for responses from the portable devices 3. Furthermore, each of the plurality of portable devices 3 transmits, with the same timing, a first response signal in response to the processing start signal, and transmits a second response signal at a timing different from the second response signals of the other portable devices 3.

The on-board device 1 is configured to detect the positions of the portable devices 3 by transmitting to each of the portable devices 3 detection signals that the plurality of portable devices 3 receives in common, so compared to a case in which communication is accomplished separately with each of the portable devices 3, it is possible to shorten the time necessary for information communication between the on-board device 1 and the portable devices 3, and it is possible to efficiently accomplish position detection of the portable devices 3.

In addition, the on-board device 1 is configured to detect the positions of the portable devices 3 by transmitting to each of the portable devices 3 a processing start signal and detection signals that the plurality of portable devices 3 receives in common, so compared to a case in which communication is accomplished separately with each of the portable devices 3, it is possible to shorten the time necessary for information communication between the on-board device 1 and the portable devices 3, and it is possible to efficiently accomplish position detection of the portable devices 3.

Furthermore, after transmitting the processing start signal, the on-board device 1 transmits detection signals without waiting for a response from the portable devices 3 that received the processing start signal. Accordingly, it is possible to shorten the time necessary for information communication between the on-board device 1 and the portable devices 3, and it is possible to efficiently accomplish position detection of the portable devices 3.

Furthermore, when one portable device 3 is present inside the vehicle or in the vicinity of the vehicle C, it is possible to accomplish vehicle inside/outside determination for the portable device 3 and to execute vehicle locking processing or unlocking processing, through the earlier-transmitted first response signal.

Even when a plurality of portable devices is present inside the vehicle or in the vicinity of the vehicle C, it is possible to execute vehicle door locking processing or unlocking processing on the basis of the second response signals transmitted from each of the portable devices 3.

With the first embodiment, the structure is such that each of the portable devices 3 transmits the first response signal and the second response signal using the point in time at which the processing start signal was received from the on-board device 1 as a reference, so it is possible to reliably prevent the second response signals transmitted from each of the portable devices 3 from being transmitted simultaneously. Accordingly, even when the on-board device 1 fails to receive the first response signals transmitted from each of the portable devices 3, the second response signals are reliably received, so it is possible to execute vehicle door locking processing or unlocking processing.

In particular, with the first embodiment, the structure is such that the portable devices 3 transmit the first response signals and the second response signals including information corresponding to the detection signals transmitted from each of the LF transmission antennas 22, so the on-board device 1 can accomplish vehicle inside/outside determination for the portable devices 3 on the basis of the first response signals and the second response signals.

In the first embodiment, the structure is such that the plurality of portable devices 3 transmits the first response signals simultaneously with timing that matches, and then transmits the second response signals with timing that differs for each of the plurality of portable devices 3. Accordingly, even when the transmission timing of the first response signal and the second response signal approach each other, there is no worry that the first response signal and the second response signal will interfere. Consequently, it is possible to make the design such that the plurality of portable devices 3 can complete the transmission of the first response signals and the second response signals in the shortest time possible, and the on-board device 1 can receive the first response signals and the second response signals at an early time.

Furthermore, in the first embodiment, the portable devices 3 detect the received signal strengths of the detection signals transmitted from each of the LF transmission antennas 22 and transmit first response signals and second response signals including the received signal strengths detected, so the on-board device 1 can identify the positions of the portable devices 3 on the basis of the received signal strengths included in the response signals received. By using the received signal strengths of the detection signals from the plurality of LF transmission antennas 22, it is possible to identify with good precision the positions of the portable devices 3.

Furthermore, with a structure that accomplishes vehicle inside/outside determination on the portable device 3 side, a portable device 3 detects the received signal strengths of the detection signals transmitted from each of the LF transmission antennas 22 and identifies its own position on the basis of the received signal strengths detected. In addition, the portable device 3 transmits information relating to its own position that has been identified to the on-board device 1, and the on-board device 1 can accomplish vehicle inside/outside determination for the portable device 3 on the basis of the information included in the response signals received. By using the received signal strengths of the detection signals from the plurality of LF transmission antennas 22, it is possible to identify with good precision the positions of the portable devices 3.

In the first embodiment, an example was described in which the on-board device 1 accomplishes vehicle inside/outside determinations for the portable devices 3, but it would be acceptable to have a structure such that a portable device 3 accomplishes its own vehicle inside/outside determination, and transmits to the on-board device 1 the first response signal and the second response signal including the result of the vehicle inside/outside determination, as information corresponding to detection signals transmitted from the LF transmission antennas 22.

In the first embodiment, an example was described in which a plurality of portable devices 3 transmits the first response signals simultaneously, but it is not necessarily required for the first response signals to be transmitted simultaneously.

Second Embodiment (Processing at Time of Engine Starting and at Time of Engine Running)

The structure of the on-board communication system according to a second embodiment is the same as that of the first embodiment, and the same reference symbols are attached to corresponding structures and detailed explanation is omitted.

FIG. 12 is a flowchart showing a processing sequence at the time of engine starting. FIG. 13 is an explanatory diagram showing a first example of processing related to engine starting. The on-board control unit 10 of the on-board device 1 monitors the operation state of an engine start switch and determines whether or not the engine start switch is in an on state (step S211). The on state is a state in which the engine start switch is depressed, and the off state is a state in which the engine start switch is not depressed.

In FIG. 13A, "trigger" shows the operation state of the engine start switch. A high-level trigger signal corresponds to a state in which the engine start switch is not depressed, and a low-level trigger signal corresponds to a state in which the engine start switch is depressed. In addition, "processing state" shows the driving state of the engine. The driving state of the engine is indicated by the vertical height indicated by the bold line. The state in which the bold line is positioned at the top corresponds to the state in which the engine is stopped, and the state in which the bold line is positioned at the bottom corresponds to the state in which the engine is driven.

When it is determined that the engine start switch is in an off state (step S211: No), the on-board control unit 10 ends processing. When it is determined that the engine start switch is in an on state (step S211; Yes), the on-board control unit 10 executes in steps S212~S218 transmission of the processing start signal and the detection signals for vehicle inside/outside determination, receiving of the response signals, confirmation processing and vehicle inside/outside determination processing, the same as in step S112 to step S118 of the first embodiment. However, in step S212, the on-board control unit 10 controls the operations of the on-board transmission unit 12 such that the processing start signals are successively transmitted using LF-band radio waves, from the first in-vehicle antenna 22*c* and the second in-vehicle antenna 22*d*. That is, first the processing start signal is transmitted from the first in-vehicle antenna 22*c*, and then the processing start signal is transmitted from the second in-vehicle antenna 22*d*.

The processing start signals are transmitted only from the first and second in-vehicle antennas 22*c* and 22*d*. This is because (i) a requirement for confirmation that a portable device 3 is inside the vehicle is a requirement for engine starting, and even if there is a legitimate portable device 3, if it is outside the vehicle, engine starting will not be performed; and (ii) there is no need for operations that transmit processing start signals from the three out-of-vehicle antennas, that is, the driver's seat antenna 22*a*, the passenger's seat antenna 22*b* and the back door antenna 22*e*, which transmit the various types of signals primarily to portable devices 3 outside the vehicle, and activate portable devices 3 outside the vehicle.

Meanwhile, the first and second in-vehicle antennas 22*c* and 22*d* cover the entire signal transmission area inside the vehicle with the two in-vehicle antennas, so it is necessary to transmit the processing start signals from two in-vehicle antennas, namely the first and second in-vehicle antennas 22*c* and 22*d*.

When it is determined in step S218 that a portable device 3 is inside the vehicle (step S218: Yes), the on-board control unit 10 executes processing to cause the engine to be started (step S219), and ends processing. More specifically, the on-board control unit 10 of the on-board device 1 executes processing to transmit to an undepicted engine ECU a signal commanding starting of the engine.

In this embodiment, when it is determined that even one portable device 3 is inside the vehicle, the on-board control unit 10 executes processing to cause starting of the engine without waiting for response signals from other portable devices 3.

When it is determined in step S218 that the portable devices 3 are outside the vehicle (step S218: No), when it is determined that a response signal has not been received (step S215: No), or when it is determined that confirmation has failed (step S216: No), the on-board control unit 10 determines whether or not a prescribed response time has elapsed (step S220). When it is determined that the prescribed response time has not elapsed (step S220: No), the on-board control unit 10 returns processing to step S215. When it is determined that the prescribed time has elapsed (step S220: Yes), the on-board control unit 10 ends processing.

Similar to the first embodiment, the structure may be such that the primary processing for computation of the statistical distances and the vehicle inside/outside determination are executed by the portable devices 3.

In addition, in the second embodiment, the structure is such that the processing start signals are transmitted from both the first in-vehicle antenna 22c and the second in-vehicle antenna 22d, but the portable devices 3 may cause a single processing start signal or detection signal transmitted from either of the in-vehicle antennas, namely the first in-vehicle antenna 22c or the second in-vehicle antenna 22d, to function as the timing start signal.

That is, if a processing start signal is caused to function as the timing start signal, the processing start signal transmitted from the first in-vehicle antenna 22c may be caused to function as the timing start signal, or the processing start signal transmitted from the second in-vehicle antenna 22d may also be caused to function as the timing start signal. Similarly, if a detection signal is caused to function as the timing start signal, the detection signal transmitted from the first in-vehicle antenna 22c may be caused to function as the timing start signal, or the detection signal transmitted from the second in-vehicle antenna 22d may also be caused to function as the timing start signal.

For example, there is a case in which one of the portable devices 3 can receive only the processing start signal and the detection signal transmitted from the first in-vehicle antenna 22c, and another portable device 3 can receive only the processing start signal and the detection signal transmitted from the second in-vehicle antenna 22d. In this case, the one portable device 3 uses the processing start signal or the detection signal transmitted from the first in-vehicle antenna 22c as the timing start signal, and the other portable device 3 uses the processing start signal or the detection signal transmitted from the second in-vehicle antenna 22d as the timing start signal.

Because the reception timing of the processing start signal and the detection signal differs depending on whether the processing start signal and the detection signal were transmitted from the first in-vehicle antenna 22c or the second in-vehicle antenna 22d, the timing start timing differs. Consequently, there are cases in which the transmission timing of the first response signal and the second response signal will deviate somewhat. However, because both the processing start signal and the detection signal are successively transmitted from the first and the second in-vehicle antennas 22c and 22d, the deviation in the transmission timing will be slight, and thus does not become a problem. The plurality of portable devices 3 transmit the first response signals at roughly the same timing, and can transmit the second response signals at timings that do not interfere.

Next, operation of an on-board communication system configured in this manner is described.

First Example

The first example is a case in which the first portable device 31 is inside the vehicle, as shown in FIG. 13B. When the user has depressed the engine start switch, as shown in FIG. 13A the on-board device 1 transmits the processing start signal from the first in-vehicle antenna 22c and the second in-vehicle antenna 22d, and then successively transmits detection signals for vehicle inside/outside determination from each of the LF transmission antennas 22 at timing that differs for each of the plurality of LF transmission antennas 22. Because the user is holding the first portable device 31, the first portable device 31 receives the processing start signals, measures the received signal strengths of the detection signals transmitted from each of the LF transmission antennas 22 and successively transmits to the on-board device 1a first response signal and a second response signal including information about the received signal strengths that were measured. Because only the first portable device 31 exists inside the vehicle or near the outside of the vehicle, the on-board device 1 can receive the first response signal transmitted from the first portable device 31. Accordingly, the on-board device 1 accomplishes a vehicle inside/outside determination for the first portable device 31, on the basis of the first response signal transmitted from the first portable device 31. In the first example, the first portable device 31 is inside the vehicle, so the on-board control unit 10 of the on-board device 1 can execute processing to cause the engine to start, on the basis of the first response signal transmitted first from the first portable device 31.

Second Example

FIG. 14 is an explanatory diagram showing a second example of processing related to engine starting. As shown in FIG. 14B, the second portable device 32 is inside the vehicle. The sequence of transmitting and receiving the processing start signals and the detection signals for vehicle inside/outside determination is the same as in the first example. However, the second portable device 32 transmits the first response signal and the second response signal successively to the on-board device 1, but the transmission timing of the second response signal is later than the first portable device 31. However, because only the second portable device 32 is present inside the vehicle or near the outside of the vehicle, the on-board device 1 can receive the first response signal transmitted from the second portable device 32. Accordingly, the on-board device 1 accomplishes a vehicle inside/outside determination for the second portable device 32 on the basis of the first response signal transmitted from the second portable device 32, and can execute processing to cause the engine to start. That is, the on-board device 1 can execute processing to cause the engine to start on the basis of the first response signal transmitted first, without waiting for the second response signal transmitted from the second portable device 32. The timing of transmitting the first response signal is the same as the first portable device 31, so even if the user is holding the second portable device 32, the on-board device 1 can cause the engine to start with the same processing time as when the user is holding the first portable device 31. Cases in which the third portable device 33, the fourth portable device 34, the fifth portable device 35 and the sixth portable device 36 are used are the same, and the on-board device 1 can cause the engine to start swiftly.

Third Example

FIG. 15 is an explanatory diagram showing a third example of processing related to engine starting. The third example is a case in which the first portable device 31 is inside the vehicle and the second portable device 32 is outside the vehicle, as shown in FIG. 15B. The sequence of transmitting and receiving the processing start signals and the detection signals for vehicle inside/outside determination is the same as in the first example. However, as shown in FIG. 15A, the first portable device 31 and the second portable device 32 transmit first response signals at the same timing. Furthermore, following transmission of the first response signal, the first portable device 31 transmits the second response signal, and the second portable device 32 transmits the second response signal after transmitting and receiving of the second response signal between the first portable device 31 and the on-board device 1 is accomplished. In the third example, both the first portable device 31 and the second portable device 32 are present inside the vehicle or near the outside of the vehicle, and because the first response signals are transmitted from the first portable device 31 and the second portable device 32 at the same timing, there are cases in which the on-board device 1 fails to receive the first response signals.

However, the on-board device 1 can receive the second response signal transmitted from the first portable device 31. Accordingly, the on-board device 1 can accomplish a vehicle inside/outside determination for the first portable device 31, on the basis of the second response signal transmitted from the first portable device 31. Because the first portable device 31 is inside the vehicle in the third example, processing to cause the engine to start is executed. That is, the on-board device 1 can execute processing to cause the engine to start on the basis of the second response signal transmitted first, from the first portable device 31, without waiting for the second response signal transmitted from the second portable device 32.

Fourth Example

Figure 16A:
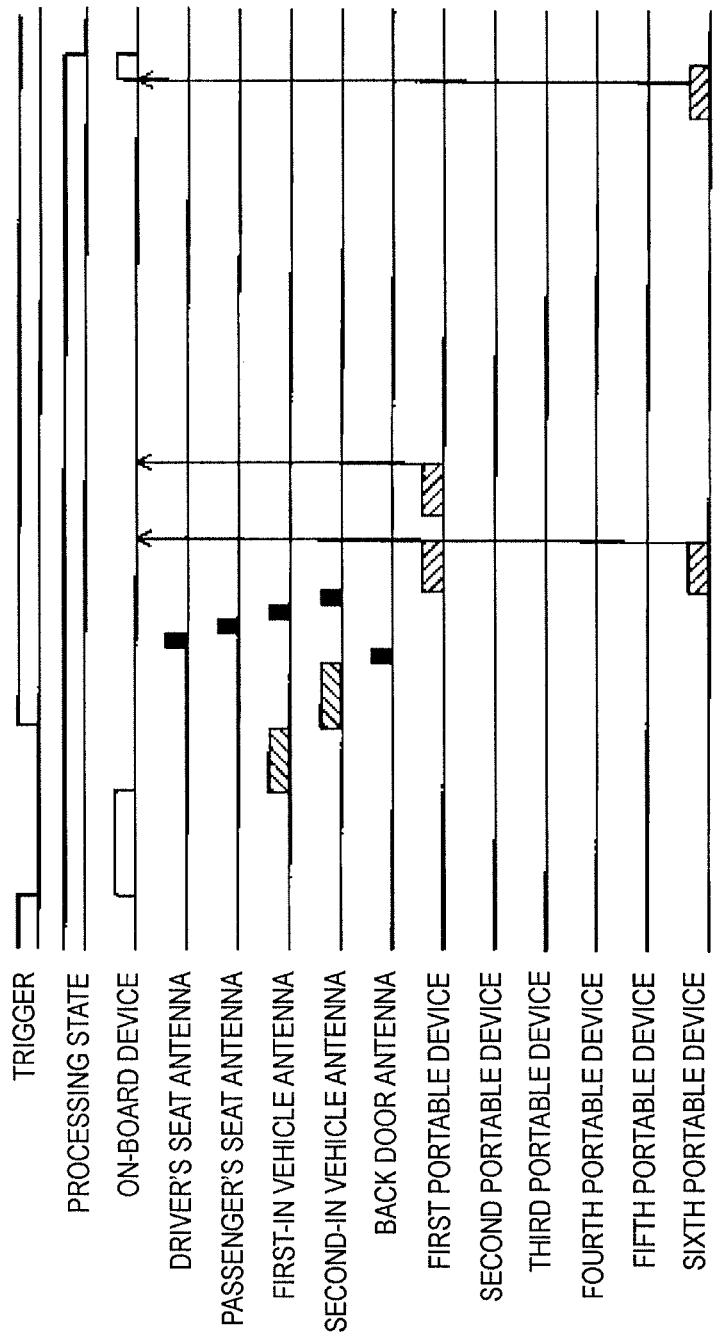
FIG. 16 is an explanatory diagram showing a fourth example of processing related to engine starting.
Figure 16B:
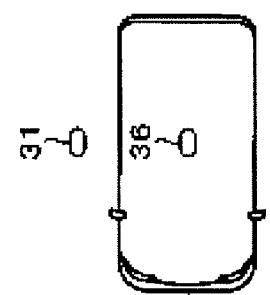

FIG. 16 is an explanatory diagram showing a fourth example of processing related to engine starting. The fourth example is a case in which the first portable device 31 is outside the vehicle and the sixth portable device 36 is inside the vehicle, as shown in FIG. 16B. The sequence of transmitting and receiving the processing start signals and the detection signals for vehicle inside/outside determination, and transmitting and receiving response signals, is the same as in the third example. In the fourth example, both the first portable device 31 and the sixth portable device 36 are present inside the vehicle or near the outside of the vehicle, and because the first response signals are transmitted from the first portable device 31 and the sixth portable device 36 at the same timing as shown in FIG. 16A, there are cases in which the on-board device 1 fails to receive the first response signals. However, the on-board device 1 can receive the second response signal transmitted from the first portable device 31, and can accomplish a vehicle inside/outside determination for the first portable device 31 on the basis of the second response signal. Because the first portable device 31 is outside the vehicle in the fourth example, processing to cause the engine to start is not executed. Next, the on-board device 1 receives the second response signal transmitted from the sixth portable device 36 and can accomplish a vehicle inside/outside determination for the sixth portable device 36 on the basis of the second response signal received. Because the sixth portable device 36 is present inside the vehicle, the on-board device 1 can execute processing to cause the engine to start, on the basis of the second response signal from the sixth portable device 36. In the fourth example, processing is slow compared to the third example, but at the latest, processing to cause the engine to start can be executed on the basis of the second response signal from the sixth portable device 36. The fourth example is an example in which processing for engine starting is delayed the most in the second embodiment, but because the structure is such that the processing start signal and the detection signals for vehicle inside/outside determination are transmitted successively to the each of the portable devices 3 at timing that differs for each of the plurality of LF transmission antennas 22, vehicle inside/outside determination can be accomplished, and processing to cause the engine to start can be executed, more efficiently than in a conventional on-board communication system.

Fifth Example

Figure 17A:
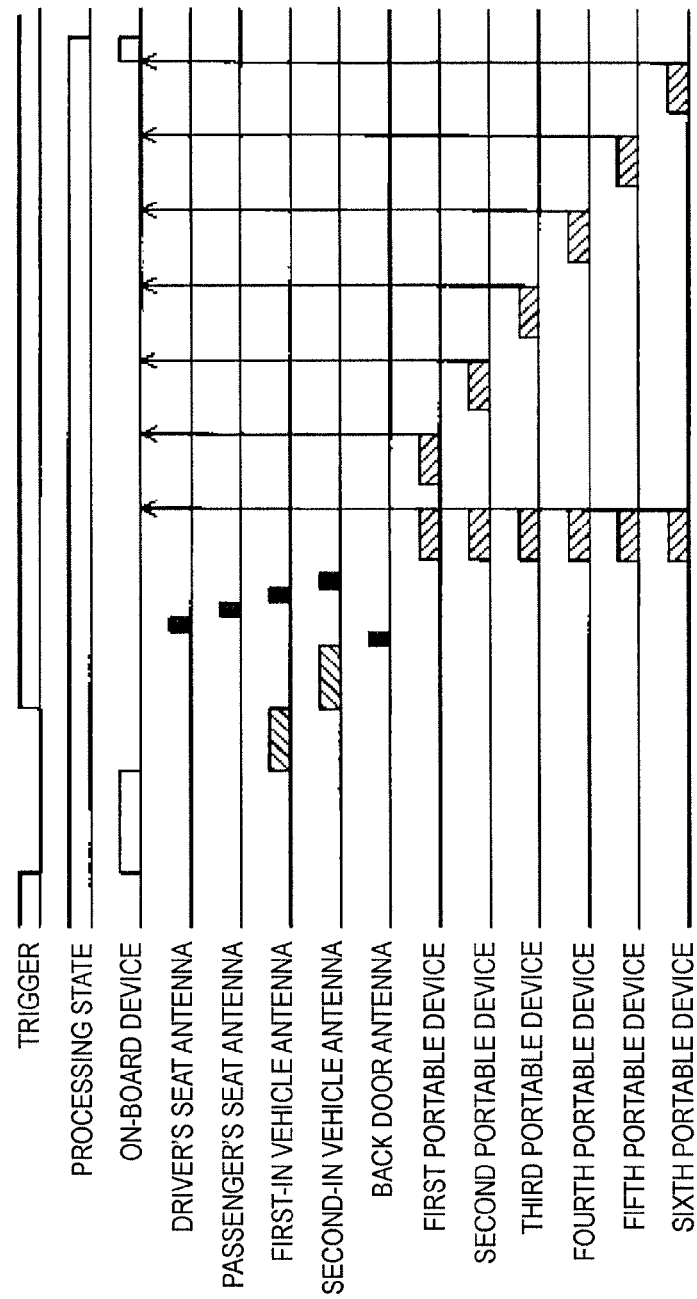
FIG. 17 is an explanatory diagram showing a fifth example of processing related to engine starting.
Figure 17B:
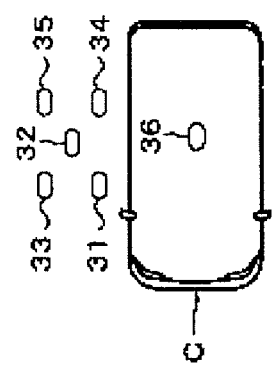

FIG. 17 is an explanatory diagram showing a fifth example of processing related to engine starting. The fifth example is a case in which the first through fifth portable devices 31, 32, . . . , 35 are outside the vehicle and the sixth portable device 36 is inside the vehicle, as shown in FIG. 17B. The sequence of transmitting and receiving the processing start signals and the detection signals for vehicle inside/outside determination, and transmitting and receiving response signals, is the same as in the fourth example. In the fifth example, the first through sixth portable devices 31, 32, . . . , 36 are present inside the vehicle or near the outside of the vehicle, and because the first response signals are transmitted from the first through sixth portable devices 31, 32, . . . , 36 at the same timing as shown in FIG. 17A, there are cases in which the on-board device 1 fails to receive the first response signals. However, the on-board device 1 can receive the second response signal transmitted from the first portable device 31, and can accomplish a vehicle inside/outside determination for the first portable device 31 on the basis of the second response signal. Because the first portable device 31 is outside the vehicle in the fifth example, processing to cause the engine to start is not executed. Similarly, a vehicle inside/outside determination is accomplished for the second through fifth portable devices 32, 33, 34 and 35, but because these are all present outside the vehicle, processing to cause the engine to start is not executed. Finally, the on-board device 1 receives the second response signal transmitted from the sixth portable device 36 and can accomplish a vehicle inside/outside determination for the sixth portable device 36 on the basis of the second response signal received. Because the sixth portable device 36 is present inside the vehicle, the on-board device 1 can execute processing to cause the engine to start, on the basis of the second response signal from the sixth portable device 36. The fifth example is a case in which the sixth portable device 36, which has the most delayed transmission timing for the second response signal, is inside the vehicle, but at the latest, processing to cause the engine to start can be executed on the basis of the second response signal from the sixth portable device 36. The fifth example, like the fourth example, is an example in which processing for engine starting is delayed the most, but because the structure is such that the processing start signals and the detection signals for vehicle inside/outside determination are transmitted successively to the each of the portable devices 3 at timing that differs for each of the plurality of LF transmission antennas 22, vehicle inside/outside determination can be accomplished, and processing to cause the engine to start can be executed, more efficiently than in a conventional on-board communication system.

Processing at the time of engine starting was described in the second embodiment, but processing of the second embodiment can also be applied to processing to confirm that a portable device 3 is present inside the vehicle while the engine is running.

With the on-board communication system, on-board device 1 and portable devices 3 according to the second embodiment, it is possible to shorten the time needed for position detection of the portable devices 3, the same as in the first embodiment. Specifically, even when a plurality of portable devices 3 are present in the vicinity of the vehicle C, it is possible to efficiently accomplish communication between the on-board device 1 and the portable devices 3, to accomplish vehicle inside/outside determinations for the portable devices 3, and to execute engine start processing.

In addition, in processing for position detection of the portable devices 3 relating to engine starting, the structure is such that processing start signals are transmitted from the first in-vehicle antenna 22c and the second in-vehicle antenna 22d out of the plurality of LF transmission antennas 22, and processing start signals are not transmitted from the other LF transmission antennas 22, so it is possible to further improve responsiveness of the on-board communication system.

Third Embodiment (Processing Relating to Trunk Lock-In Prevention)

The structure of the on-board communication system according to a third embodiment is the same as that of the first embodiment, and the same reference symbols are attached to corresponding structures and detailed explanation is omitted.

In addition to the structures that are the same as in the on-board communication system of the first embodiment, the on-board communication system according to the third embodiment comprises an undepicted trunk antenna. The trunk antenna is one of the LF transmission antennas 22. The trunk antenna is disposed inside the trunk of the vehicle C and is structured such that the on-board transmission unit 12 transmits various types of signals from the trunk antenna under control by the on-board control unit 10. The remainder of the structure is the same as that of the first embodiment, and the same reference symbols are attached to the corresponding structures and detailed explanation is omitted.

FIG. 18 is a flowchart showing a processing sequence related to trunk lock-in prevention. FIG. 19 is an explanatory diagram showing a first example of processing related to preventing trunk lock-in.

The on-board control unit 10 of the on-board device 1 monitors the operation state of the back door switch 43, and determines whether or not a locking operation was performed by the back door switch 43 (step S311). That is, the on-board control unit 10 determines whether or not the back door switch 43 has been depressed, in a state in which the back door is unlocked.

Figure 19A:
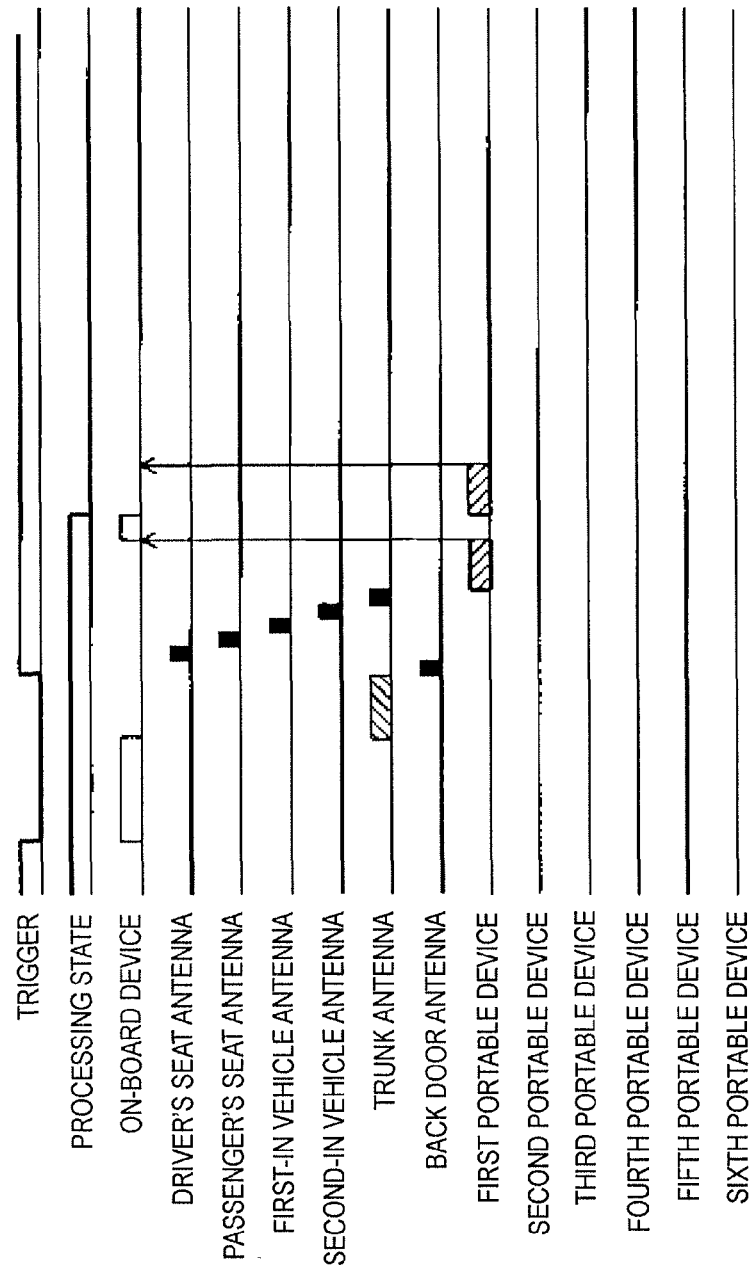

In FIG. 19A, "trigger" shows the state of a locking operation by the back door switch 43. A high-level trigger signal corresponds to a state in which the back door switch 43 is not depressed, and a low-level trigger signal corresponds to a state in which a locking operation has been performed by the back door switch 43. In addition, "processing state" shows a warning processing state relating to trunk lock-in of the portable devices 3. The warning processing state is indicated by vertical height indicated by the bold line. The state in which the bold line is positioned at the top corresponds to the state in which warning processing is not performed, and a state in which the bold line is positioned at the bottom indicates a state in which warning processing is performed.

When it is determined that a locking operation has not been performed by the back door switch 43 (step S311: No), the on-board control unit 10 ends processing. When it is determined that a locking operation has been performed by the back door switch 43 (step S311: Yes), the on-board control unit 10 controls the operations of the on-board transmission unit 12 such that a processing start signal is transmitted from the trunk antenna (step S312). Next, the on-board control unit 10 executes transmission of detection signals for a vehicle inside/outside determination, reception of response signals, confirmation processing and processing of the vehicle inside/outside determination in steps S313 to S318, the same as in steps S113 to S118 of the first embodiment.

When it is determined in step S318 that a portable device 3 is inside the vehicle (step S318: Yes), the on-board control unit 10 executes processing to issue a warning (step S319) and then ends processing. The warning of step S319 is to notify the user that the portable device 3 is being locked in the trunk. The method of the warning is not particularly limited, and issuing a warning sound is acceptable, causing a warning lamp to flash is acceptable and accomplishing a warning by causing the vehicle C and the on-board device 1 to perform specific actions is also acceptable.

In this embodiment, when it is determined that even one of the portable device 3 is in the vehicle, the on-board control unit 10 executes processing to issue a warning without waiting for a response signal from another portable device 3.

When it is determined in step S318 that a portable device 3 is outside the vehicle (step S318: No), when it is determined that a response signal has not been received (step S315: No) or when it is determined that confirmation has failed (step S316: No), the on-board control unit 10 determines whether or not a prescribed response time has elapsed (step S320). When the prescribed response time has not elapsed (step S320: No), the on-board control unit 10 returns processing to step S315. When it is determined that the prescribed time has elapsed (step S320: Yes), the on-board control unit 10 ends processing.

In FIG. 18, processing related to locking the back door is not described, but processing relating to separately locking the back door may be executed. It is also acceptable, if at least one of the portable devices 3 is outside the vehicle, for the vehicle doors to be locked even if another portable device 3 is inside the trunk. A structure is also acceptable in which vehicle doors lock on condition that a portable device 3 is not present in the trunk.

Similar to the first embodiment, the structure may be such that primary processing for the statistical distance computation and the vehicle inside/outside determination is executed by the portable device 3.

Next, the operation of an on-board communication system structured as above is described.

First Example

Figure 19B:
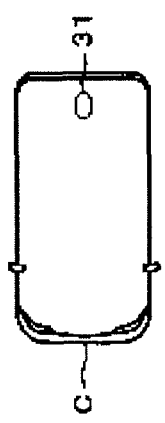

FIG. 19 is an explanatory diagram showing a first example of processing related to preventing trunk lock-in. The first example is a case in which the first portable device 31 is inside the trunk, as shown in FIG. 19B. When the user depresses the back door switch 43 and a trunk locking operation is performed, as shown in FIG. 19A the on-board device 1 transmits a processing start signal from the trunk antenna, and then detection signals for vehicle inside/outside determination are transmitted successively from each of the LF transmission antennas 22 at timing that differs for each of the plurality of LF transmission antennas 22. Because the first portable device 31 is present in the trunk, the first portable device 31 receives the processing start signal, measures the received signal strengths of signals transmitted from each of the LF transmission antennas 22 and successively transmits to the on-board device 1a first response signal and a second response signal including information about the received signal strengths measured. Because only the first portable device 31 is present inside the vehicle or near the outside of the vehicle, the on-board device 1 can receive the first response signal transmitted from the first portable device 31. Accordingly, the on-board device 1 performs a vehicle inside/outside determination for the first portable device 31 on the basis of the first response signal transmitted from the first portable device 31. Because in the first example the first portable device 31 is inside the trunk, the on-board control unit 10 of the on-board device 1 can accomplish the vehicle inside/outside determination on the basis of the first response signal transmitted first from the first portable device 31, and can issue a warning to prevent the portable device 3 from being locked in the trunk.

Second Example

FIG. 20 is an explanatory diagram showing a second example of processing related to preventing trunk lock-in. The second example is a case in which the first portable device 31 is inside the trunk and the second portable device 32 is outside the vehicle, as shown in FIG. 20B. The sequence of transmitting and receiving the processing start signal and the detection signals for vehicle inside/outside determination is the same as in the first example. However, as shown in FIG. 20A, the first portable device 31 and the second portable device 32 transmit the first response signals at the same timing. Furthermore, following transmission of the first response signals, the first portable device 31 transmits the second response signal and the second portable device 32 transmits the second response signal after transmitting and receiving of the second response signal between the first portable device 31 and the on-board device 1 have been accomplished. In the second example, both the first portable device 31 and the second portable device 32 are present inside the vehicle or near the outside of the vehicle and the first response signals are transmitted at the same timing from the first portable device 31 and the second portable device 32, so there are cases in which the on-board device 1 fails to receive the first response signal.

However, the on-board device 1 can receive the second response signal transmitted from the first portable device 31. Accordingly, the on-board device 1 can accomplish the vehicle inside/outside determination for the first portable device 31 on the basis of the second response signal transmitted from the first portable device 31. In the second example, the first portable device 31 is inside the trunk, so a warning can be produced to the effect that the portable device 3 is being locked in the trunk. That is, the on-board device can produce a warning on the basis of the second response signal transmitted first from the first portable device 31, without waiting for the second response signal transmitted from the second portable device 32.

Third Example

Figure 21A:
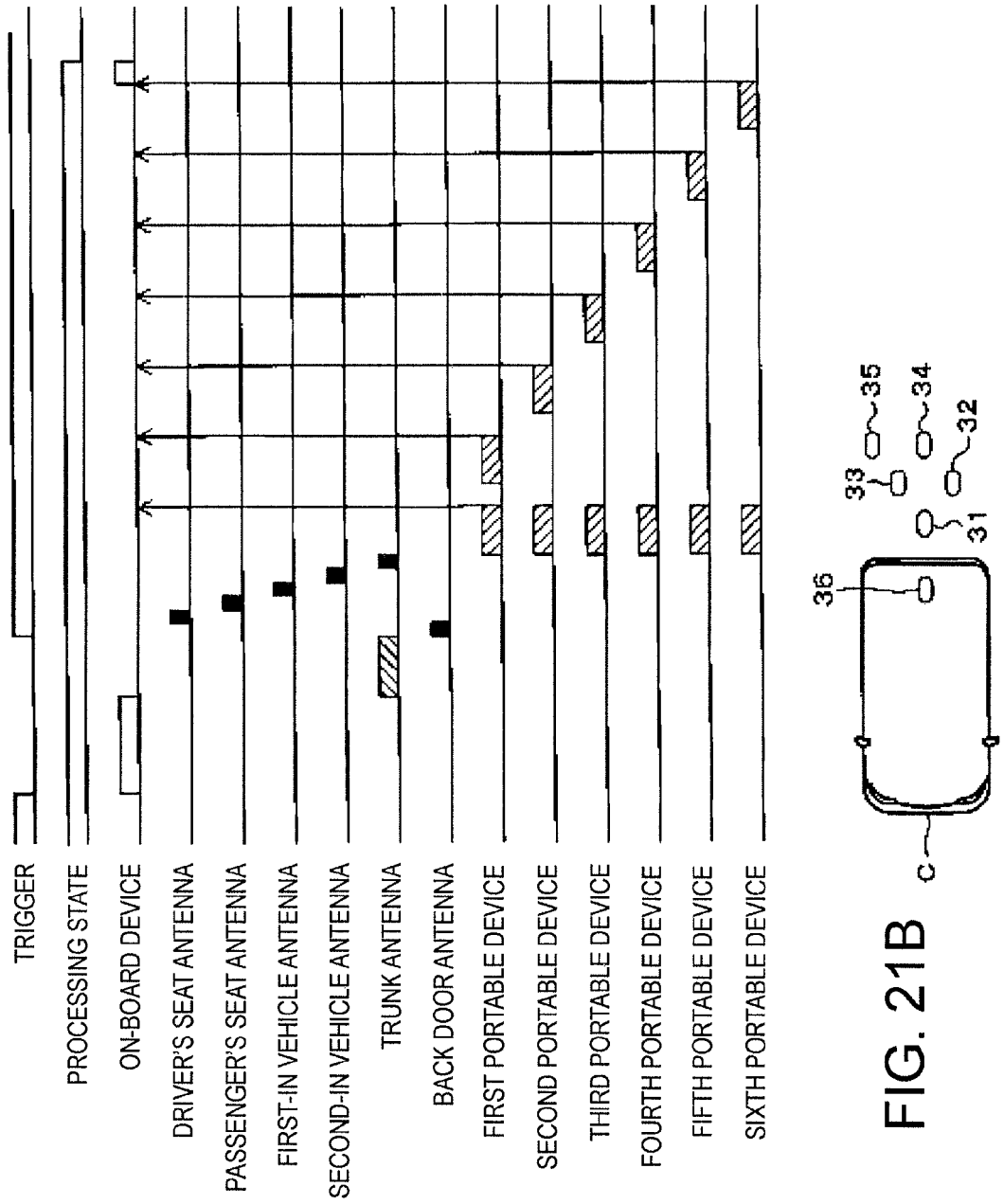
Figure 21B:
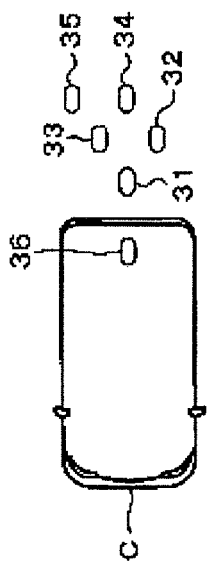

FIG. 21 is an explanatory diagram showing a third example of processing related to preventing trunk lock-in. The third example is a case in which the first through fifth portable devices 31, 32, . . . , 35 are outside the vehicle and the sixth portable device 36 is inside the trunk, as shown in FIG. 21B. The sequence of transmitting and receiving the processing start signal, the detection signals for vehicle inside/outside determination and the response signals is the same as in the second example. In the third example, the first through sixth portable devices 31, 32, . . . , 36 are present inside the vehicle or near the outside of the vehicle, and because the first response signals are transmitted from the first through sixth portable devices 31, 32, . . . , 36 at the same timing, as shown in FIG. 21A, there are cases in which the on-board device 1 fails to receive the first response signals. However, the on-board device 1 can receive the second response signal transmitted from the first portable device 31 and can accomplish the vehicle inside/outside determination for the first portable device 31 on the basis of the second response signal. In the third example, the first portable device 31 is outside the vehicle, so warning processing is not executed. Similarly, vehicle inside/outside determinations are accomplished for the second through fifth portable devices 32, 33, 34 and 35, but because these are all present outside the vehicle, warning processing is not executed. Lastly, the on-board device 1 receives the second response signal transmitted from the sixth portable device 36 and accomplishes the vehicle inside/outside determination for the sixth portable device 36 on the basis of the second response signal received. Because the sixth portable device 36 is present inside the trunk, the on-board device 1 can execute warning processing on the basis of the second response signal received from the sixth portable device 36. The third example is a case in which the sixth portable device 36, which has the most delayed transmission timing for the second response signal, is inside the trunk, but at the latest, it is possible to execute warning processing on the basis of the second response signal from the sixth portable device 36. The third example is an example in which warning processing is most delayed, but because the structure is such that the processing start signal and detection signals for vehicle inside/outside determination are transmitted successively with differing timing to each of the portable devices 3, it is possible to accomplish vehicle inside/outside determination, and execute warning processing to prevent trunk lock-in, more efficiently than in a conventional on-board communication system.

With the on-board communication system, on-board device 1 and portable devices 3 according to the third embodiment, it is possible to shorten the time needed for position detection of the portable devices 3, the same as in the first embodiment. Specifically, even when a plurality of portable devices 3 are present in the vicinity of the vehicle C, it is possible to efficiently accomplish communication between the on-board device 1 and the portable devices 3, to accomplish vehicle inside/outside determination for the portable devices 3 and to execute warning processing to prevent trunk lock-in.

The embodiments disclosed here are exemplary in every aspect, and should be considered as not being restrictive. The scope of the invention is indicated by the scope of the claims, not the meanings described above, and it is intended that equivalents of the claim scope, and all modifications within the scope, are included.

EXPLANATION OF SYMBOLS 1 on-board device
3 portable device
10 on-board control unit
11 on-board reception unit
12 on-board transmission unit
13 storage unit for on-board device
14 timer unit for on-board device
21 RF reception antenna
22 LF transmission antenna
22a driver's seat antenna
22b passenger's seat antenna
22c first in-vehicle antenna
22d second in-vehicle antenna
22e back door antenna
31 first portable device
31a portable control unit
31b portable reception unit
31c received signal strength detection unit
31d reception antenna
31e portable transmission unit
31f RF transmission antenna
31g storage unit for portable device
31h timer unit for portable device
32 second portable device
33 third portable device
34 fourth portable device
35 fifth portable device
36 sixth portable device
41 driver's seat door switch
42 passenger's seat door switch
43 back door switch
44 door opened/closed detection switch
C vehicle

What is claimed is:

1. An on-board communication system comprising (i) an on-board device that transmits detection signals from a plurality of antennas provided in a vehicle and (ii) a plurality of portable devices that transmit response signals corresponding to the received detection signals, the on-board device performing position detection of the portable devices by receiving the response signals transmitted from the portable devices; wherein:
the on-board device comprises an on-board transmission unit that (i) prior to transmission of the detection signals, transmits from the antennas a processing start signal for causing the start of reception processing of the detection signals by the portable devices, and (ii) after transmission of the processing start signal, successively transmits the detection signals from the plurality of antennas, at a different timing for each of the plurality of antennas, without waiting for a response from the portable devices confirming reception of the processing start signal;
the processing start signal and the detection signals are signals received in common by the plurality of portable devices; and
each of the portable devices comprises
(i) a portable reception unit that, when the processing start signal transmitted by the on-board transmission unit is received, starts reception of the detection signals, and receives the detection signals transmitted by the on-board transmission unit, and
(ii) a portable transmission unit that, when the portable reception unit has received the detection signals, transmits the response signals, which include information corresponding to the received detection signals.

2. The on-board communication system according to claim 1, wherein:
each of the portable devices is provided with a detection unit that detects received signal strengths of the detection signals received by the portable reception unit;
the portable transmission unit transmits the response signals, which include the received signal strengths detected by the detection unit; and
the on-board device identifies the position of the portable devices, on the basis of the received signal strengths included in the response signals.

3. The on-board communication system according to claim 2, wherein a vehicle processing is performed, or not performed, depending on the identified position of the portable devices.

4. The on-board communication system according to claim 3, wherein the vehicle processing comprises door locking or unlocking processing, and is performed only if the identified position of at least one of the portable devices is outside the vehicle.

5. The on-board communication system according to claim 3, wherein the vehicle processing comprises engine start processing, and is performed only if the identified position of at least one of the portable devices is inside the vehicle.

6. The on-board communication system according to claim 3, wherein the vehicle processing comprises processing to prevent one of the portable devices from being locked in a trunk of the vehicle, and is performed only if the identified position of at least one of the portable devices is inside the vehicle.

7. The on-board communication system according to claim 1, wherein:
each of the portable devices (i) is provided with a detection unit that detects received signal strengths of the detection signals received by the portable reception unit, and (ii) identifies a position of the portable device on the basis of the received signal strengths detected by the detection unit; and
the portable transmission unit transmits response signals, which include identified position information.

8. An on-board device that (i) transmits, from a plurality of antennas provided in a vehicle, detection signals for detecting the position of a plurality of portable devices, and (ii) performs position detection of the portable devices by receiving response signals transmitted from the portable devices in response to the detection signals;
wherein the on-board device comprises an on-board transmission unit that (i) prior to transmission of the detection signals, transmits from the antennas a processing start signal for causing the start of reception processing of the detection signals by the portable devices, and (ii) after transmission of the processing start signal, successively transmits the detection signals from the plurality of antennas, at a different timing for each of the plurality of antennas, without waiting for a response from the portable devices confirming reception of the processing start signal; and the processing start signal and the detection signals are signals received in common by the plurality of portable devices.

9. The on-board device according to claim 8, wherein a vehicle processing is performed, or not performed, depending on the identified position of the portable devices.

10. The on-board device according to claim 9, wherein the vehicle processing comprises door locking or unlocking processing, and is performed only if the identified position of at least one of the portable devices is outside the vehicle.

11. The on-board device according to claim 9, wherein the vehicle processing comprises engine start processing, and is performed only if the identified position of at least one of the portable devices is inside the vehicle.

12. The on-board device according to claim 9, wherein the vehicle processing comprises processing to prevent one of the portable devices from being locked in a trunk of the vehicle, and is performed only if the identified position of at least one of the portable devices is inside the vehicle.

* * * * *